United States Patent
Kim et al.

(10) Patent No.: US 9,973,253 B2
(45) Date of Patent: May 15, 2018

(54) METHOD FOR FEEDING BACK CHANNEL STATE INFORMATION IN WIRELESS COMMUNICATION SYSTEM, AND APPARATUS THEREFOR

(71) Applicant: LG ELECTRONICS INC., Seoul (KR)

(72) Inventors: Youngtae Kim, Seoul (KR); Kijun Kim, Seoul (KR); Jonghyun Park, Seoul (KR); Hyukjin Chae, Seoul (KR); Hyungtae Kim, Seoul (KR); Myoungseob Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 34 days.

(21) Appl. No.: 15/101,889

(22) PCT Filed: Dec. 5, 2014

(86) PCT No.: PCT/KR2014/011907
§ 371 (c)(1),
(2) Date: Jun. 3, 2016

(87) PCT Pub. No.: WO2015/084094
PCT Pub. Date: Jun. 11, 2015

(65) Prior Publication Data
US 2017/0310375 A1     Oct. 26, 2017

Related U.S. Application Data

(60) Provisional application No. 61/912,493, filed on Dec. 5, 2013.

(51) Int. Cl.
*H04B 7/06* (2006.01)
*H04L 1/00* (2006.01)
(Continued)

(52) U.S. Cl.
CPC .......... *H04B 7/066* (2013.01); *H04B 7/0645* (2013.01); *H04L 1/0026* (2013.01);
(Continued)

(58) Field of Classification Search
CPC .... H04B 7/0626; H04B 7/0658; H04B 7/066; H04L 1/0026; H04L 1/0027; H04W 24/10
See application file for complete search history.

(56) References Cited

U.S. PATENT DOCUMENTS

2011/0249643 A1* 10/2011 Barbieri ................ H04L 1/0026
370/329
2015/0304911 A1* 10/2015 Wang ................ H04W 36/0088
370/331

FOREIGN PATENT DOCUMENTS

KR          10-1128801          3/2012
KR     10-2012-0074254          7/2012
(Continued)

OTHER PUBLICATIONS

PCT International Application No. PCT/KR2014/011907, Written Opinion of the International Searching Authority dated Mar. 26, 2015, 16 pages.

*Primary Examiner* — Pao Sinkantarakorn
(74) *Attorney, Agent, or Firm* — Lee, Hong, Degerman, Kang & Waimey

(57) ABSTRACT

The present invention relates to a method for a first terminal to report channel state information (CSI) in a wireless communication system, the method comprising the steps of: receiving, from a base station, an allocation of a group CSI report setting associated with a terminal group including the first terminal; broadcasting the group CSI report setting to the terminal group; and reporting group CSI to the base station, wherein the terminal group consists of the first terminal and at least one second terminal, and the group CSI report setting defines, as the group CSI, the CSI of the first (Continued)

terminal corresponding to a part of the CSI about each of a plurality of terminals constituting the terminal group.

14 Claims, 15 Drawing Sheets

(51) Int. Cl.
*H04L 5/00* (2006.01)
*H04W 24/10* (2009.01)

(52) U.S. Cl.
CPC ............ *H04L 5/0053* (2013.01); *H04B 7/063* (2013.01); *H04B 7/0632* (2013.01); *H04L 1/0027* (2013.01); *H04W 24/10* (2013.01)

(56) References Cited

FOREIGN PATENT DOCUMENTS

| | | |
|---|---|---|
| KR | 10-2013-0100716 | 9/2013 |
| WO | 2012/091418 | 7/2012 |
| WO | 2013/141592 | 9/2013 |

\* cited by examiner

FIG. 2
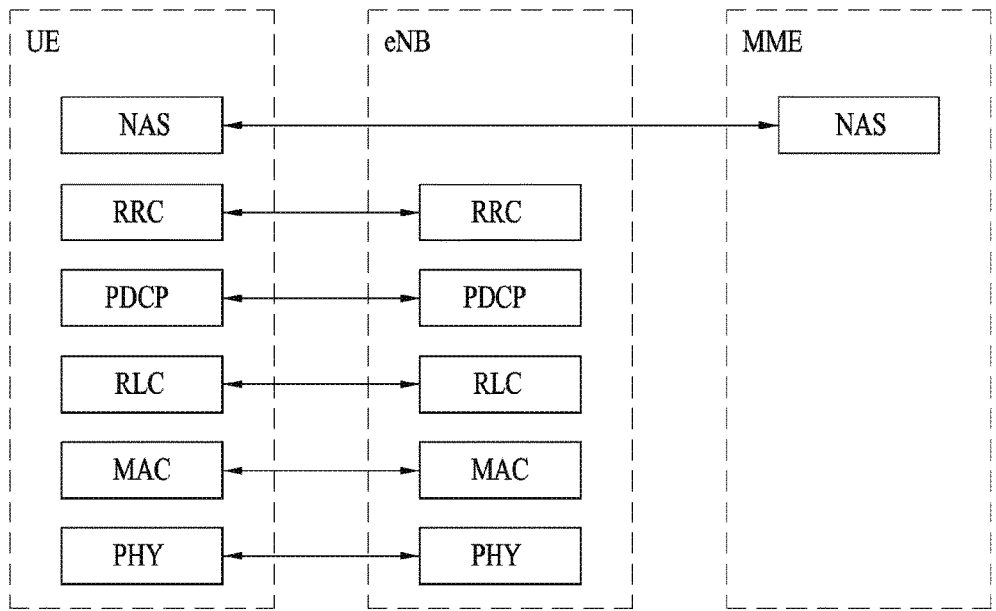
(a) control-plane protocol stack
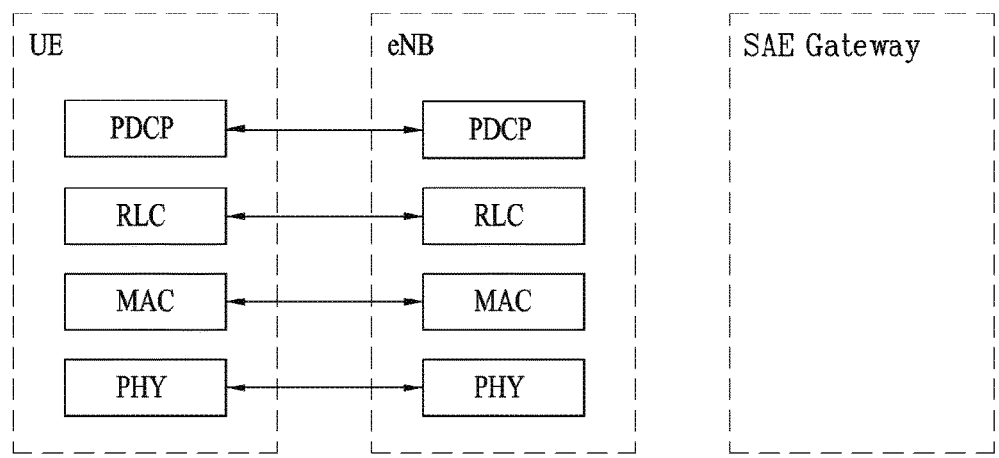
(b) user-plane protocol stack

| CQI Reporting Mode | | PMI feedback type | |
|---|---|---|---|
| | | No PMI | single PMI |
| PUCCH CQI feedback type | WB (WB CQI) | mode 1-0 | mode 1-1 |
| | UE-selection (subband CQI) | mode 2-0 | mode 2-1 |

(a)　　　　　　　　　　　(b)

METHOD FOR FEEDING BACK CHANNEL STATE INFORMATION IN WIRELESS COMMUNICATION SYSTEM, AND APPARATUS THEREFOR

CROSS-REFERENCE TO RELATED APPLICATIONS

This application is the National Stage filing under 35 U.S.C. 371 of International Application No. PCT/KR2014/011907, filed on Dec. 5, 2014, which claims the benefit of U.S. Provisional Application No. 61/912,493, filed on Dec. 5, 2013, the contents of which are all hereby incorporated by reference herein in their entirety.

TECHNICAL FIELD

The present invention relates to a wireless communication system, and more particularly, to a method for feeding back channel state information in a wireless communication system and apparatus therefor.

BACKGROUND ART

As an example of a mobile communication system to which the present invention is applicable, a 3rd Generation Partnership Project Long Term Evolution (hereinafter, referred to as LTE) communication system is described in brief.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

A UE reports channel state information (CSI) of a current channel to an eNB periodically and/or aperiodically to assist the eNB to efficiently manage a wireless communication system. Since the reported CSI may include results obtained through calculation in consideration of various situations, a more effective reporting method is required.

DISCLOSURE OF THE INVENTION

Technical Task

Based on the above discussion, a method for reporting channel state information in a wireless communication system and apparatus therefor are proposed in the following.

The technical problems solved by the present invention are not limited to the above technical problems and those skilled in the art may understand other technical problems from the following description.

Technical Solutions

In one technical aspect of the present invention, provided herein is a method of reporting CSI (channel state information) by a first user equipment in a wireless communication system, including the steps of being assigned a group CSI reporting configuration associated with a user equipment group including the first user equipment by a base station, broadcasting the group CSI reporting configuration to the user equipment group and reporting group CSI to the base station. The user equipment group may be composed of the first user equipment and at least one of second user equipments. In addition, the group CSI reporting configuration may define CSI of the first user equipment corresponding to part of CSI of a plurality of individual user equipments constituting the user equipment group as the group CSI.

Further, a user equipment reporting an intermediate value of the CSI of the individual user equipments belonging to the user equipment group may be determined as the first user equipment.

Further, a user equipment having a minimum range of fluctuations in the CSI of the individual user equipments belonging to the user equipment group may be determined as the first user equipment.

Further, the method may further include the steps of overhearing CSI reporting of individual second user equipments and determining whether to report the group CSI based on the CSI reporting of the individual second user equipments.

Further, each of the second user equipments may be configured to independently transmit separate CSI, which does not correspond to the group CSI, of CSI of the each of the second user equipments. Preferably, the each of the second user equipments may be configured to transmit an indicator for distinguishing the separate CSI from the group CSI to the base station. More preferably, the each of the second user equipments may report the CSI based on a PUCCH (physical uplink control channel) reporting type defined for reporting the indicator. In this case, the indicator may indicate an identifier of a user equipment transmitting the group CSI associated with individual second user equipments.

In another technical aspect of the present invention, provided herein is a first user equipment for reporting CSI (channel state information) in a wireless communication system, including a radio frequency unit and a processor. The processor may be configured to be assigned a group CSI reporting configuration associated with a user equipment group including the first user equipment by a base station, broadcast the group CSI reporting configuration to the user equipment group, and report group CSI to the base station. Moreover, the user equipment group may be composed of the first user equipment and at least one of second user equipments. Furthermore, the group CSI reporting configuration may define CSI of the first user equipment corresponding to part of CSI of a plurality of individual user equipments constituting the user equipment group as the group CSI.

In the other technical aspect of the present invention, provided herein is a method of receiving CSI (channel state information) reporting by a base station in a wireless communication, including the steps of assigning a group CSI reporting configuration associated with a user equipment group to a first user equipment, receiving group CSI from the first user equipment, and receiving separate CSI from at least one of second user equipments. The user equipment group may be composed of the first user equipment and the at least one of the second user equipments. In addition, the group CSI reporting configuration may define CSI of the first user equipment corresponding to part of CSI of a plurality of individual user equipments constituting the user equipment group as the group CSI.

Advantageous Effects

According to embodiments of the present invention, channel state information can be efficiently reported in a wireless communication.

It will be appreciated by persons skilled in the art that that the effects achieved by the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

FIG. 2 is a diagram showing a control plane and a user plane of a radio interface protocol between a UE and an E-UTRAN based on a 3rd generation partnership project (3GPP) radio access network standard.

BEST MODE FOR INVENTION

Figure 1:
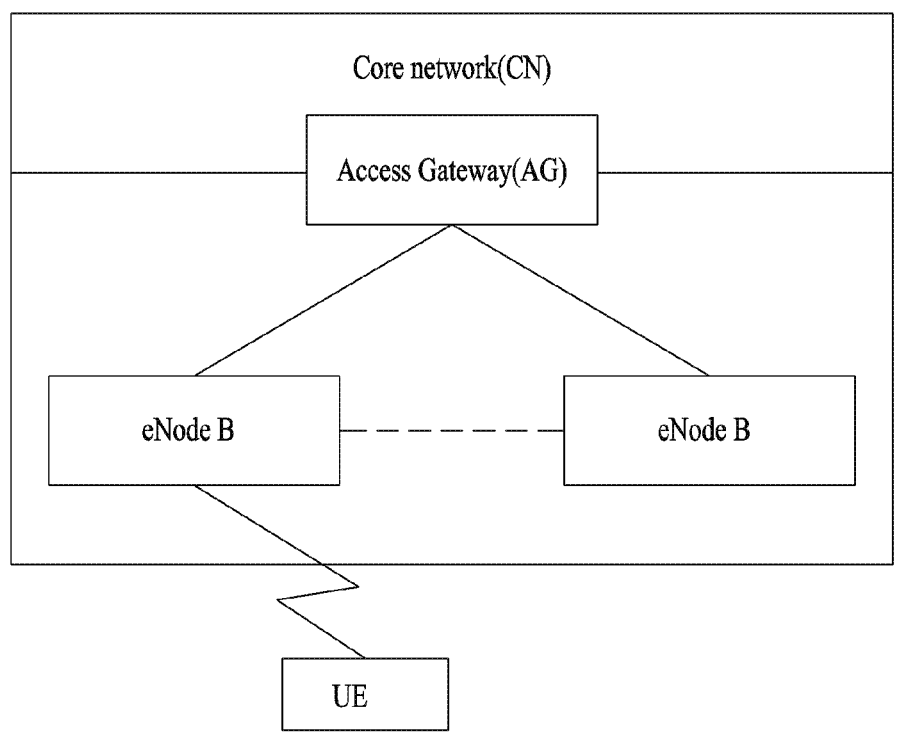
FIG. 1 is a diagram showing a network structure of an Evolved Universal Mobile Telecommunications System (E-UMTS) as an example of a wireless communication system.

Hereinafter, reference will now be made in detail to the preferred embodiments of the present invention, examples of which are illustrated in the accompanying drawings. The detailed description of the present invention is provided to facilitate the understanding of the configuration, operation, and other characteristics of the present invention. The following embodiments of the present invention correspond to examples wherein the technical features of the present invention are applied in the 3GPP system.

In this specification, the embodiments of the present invention are explained based on the LTE system and the LTE-A system. However, this is merely exemplary and, therefore, the embodiments of the present invention can be applied to various communication systems corresponding to the above-mentioned definition. Moreover, although the embodiments of the present invention are described based on FDD, this is also merely exemplary. The embodiments of the present invention can be easily modified and applied to H-FDD or TDD.

FIG. 2 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A Radio Resource Control (RRC) located at a lowest portion of the third layer is defined only in the control plane. The RRC layer handles logical channels, transport channels and physical channels for the configuration, re-configuration and release of Radio Bearers (RBs). Here, the RBs refer to services provided by the second layer, for data transfer between the UE and the network. The RRC layers of the UE and the network exchange RRC messages with each other. If the RRC layers of the UE and the network are RRC-connected, the UE is in an RRC connected mode and, if so not, is in an RRC idle mode. A Non-Access Stratum (NAS) layer located at a layer higher than the RRC layer performs a function such as session management and mobility management.

One cell configuring a base station (eNB) provides a downlink or uplink transmission service to several UEs using any one of bandwidths of 1.4, 3, 5, 10, 15 and 20 MHz. Different cells may be set to provide different bandwidths.

Examples of a downlink transport channel for transmitting data from the network to the UE include a Broadcast Channel (BCH) for transmitting system information, a Paging Channel (PCH) for transmitting a paging message, or a downlink Shared Channel (SCH) for transmitting user traffic or a control message. Traffic or a control message of a broadcast service or downlink multicast may be transmitted through the downlink SCH or a separate downlink Multicast Channel (MCH). Examples of an uplink transport channel for transmitting data from the UE to the network include a Random Access Channel (RACH) for transmitting an initial control message and an uplink SCH for transmitting user traffic or a control message. Examples of a logical channel located at a layer above the transport channel and mapped to the transport channel includes a Broadcast Control Channel (BCCH), a Paging Control Channel (PCCH), a Common Control Channel (CCCH), a Multicast Control Channel (MCCH), a Multicast Traffic Channel (MTCH), etc.

Figure 3:
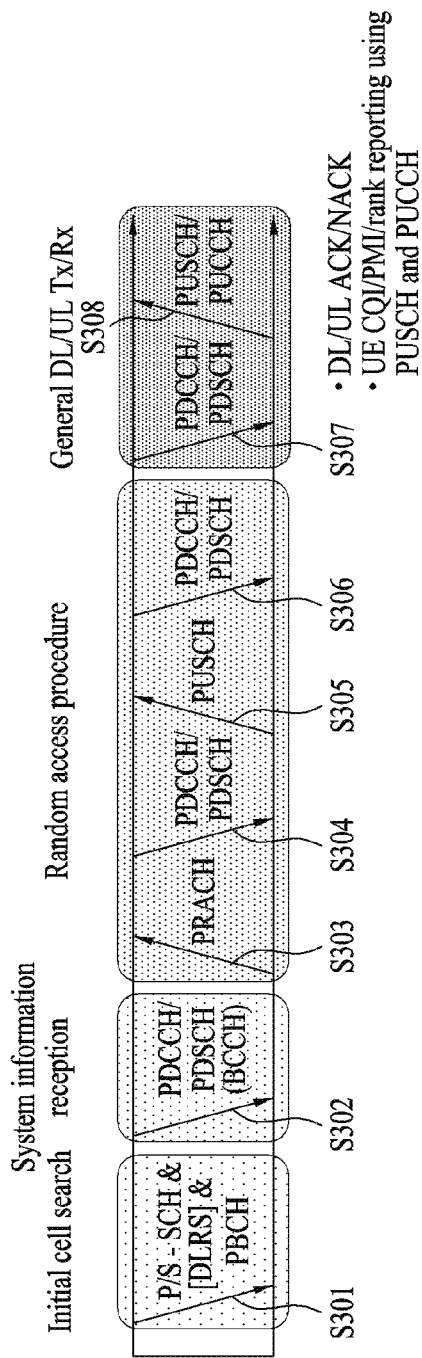
FIG. 3 is a diagram illustrating physical channels used in a 3GPP system and a general signal transmitting method using the same.

FIG. 3 is a diagram illustrating physical channels used in a 3GPP system and a general signal transmitting method using the same.

If a UE is powered on or newly enters a cell, the UE performs an initial cell search operation such as synchronization with a base station (S301). The UE receives a primary synchronization channel (P-SCH) and a secondary synchronization channel (S-SCH) from the base station so as to synchronize with the base station and to acquire information such as a cell ID. Thereafter, the UE may receive a physical broadcast channel from the base station so as to acquire a broadcast signal in the cell. The UE may receive a downlink reference signal (DL RS) so as to check a downlink channel state in the initial cell search step.

The UE, upon completion of initial cell search, may receive a Physical Downlink Control Channel (PDCCH) and a Physical Downlink Shared Channel (PDSCH) according to information carried in the PDCCH so as to acquire more detailed system information (S302).

When the UE initially accesses the base station or when radio resources for signal transmission are not present, the UE may perform a Random Access Procedure (RACH) with respect to the base station (steps S303 to S306). The UE may transmit a specific sequence using a preamble through a Physical Random Access Channel (PRACH) (S303) and receive a response message of the preamble through the PDCCH and the PDSCH corresponding thereto (S304). In the contention-based RACH a contention resolution procedure, such as a transmission of the PRACH (S305) and a reception of the PDCCH and the PDSCH corresponding thereto (S306), may be additionally performed.

The UE which performs the above-described procedure may receive the PDCCH/PDSCH (S307) and transmit a Physical Uplink Shared Channel (PUSCH)/Physical Uplink Control Channel (PUCCH) (S308), as a general uplink/downlink signal transmission procedure. Specifically, the UE receives downlink control information (DCI) through the PDCCH. Here, the DCI includes control information such as resource allocation information for the UE, and has a different format depending on the use thereof.

Meanwhile, the information transmitted from the UE to the base station in uplink and transmitted from the base station to the UE may include a downlink/uplink ACK/NACK signal, a Channel Quality Indicator (CQI), a Precoding Matrix Index (PMI), a Rank Indicator (RI), etc. In the 3GPP LTE system, the UE may transmit the above-described information such as CQI/PMI/RI through the PUSCH and/or the PUCCH.

Figure 4:
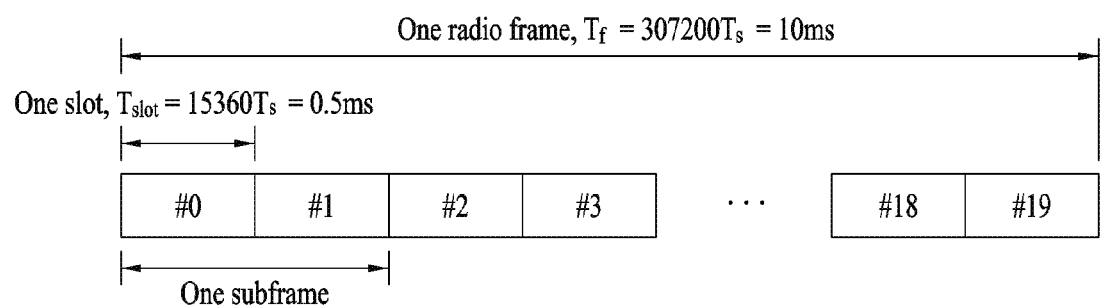
FIG. 4 illustrates exemplary radio frame structures in a LTE system.

FIG. 4 illustrates exemplary radio frame structures in a LTE system.

Referring to FIG. 4, a radio frame is 10 ms (307200 $T_s$) and divided into 10 equal-sized subframes. The 10 subframes of a radio frame may be indexed. Herein, $T_s$ represents a sampling time and $T_s=1/(2048*15 \text{ kHz})$ (approximately, 33 ns). Each subframe is 1 ms long, including two slots. Each slot is 0.5 ms (15360 $T_s$) long. A slot includes a plurality of orthogonal frequency division multiplexing (OFDM) symbols in the time domain and a plurality of resource blocks (RBs) in the frequency time. In a LTE system, single resource block includes 12 (subcarriers)*7 (or 6) OFDM symbols. TTI (Transmission Time Interval), which is unit time for data transfer, can be defined by one or more subframes. The aforementioned structure of the radio frame is shown for exemplary purposes only. Thus, the number of subframes included in the radio frame or the number of slots included in the subframe or the number of OFDM symbols included in the slot may be modified in various manners.

Figure 5:
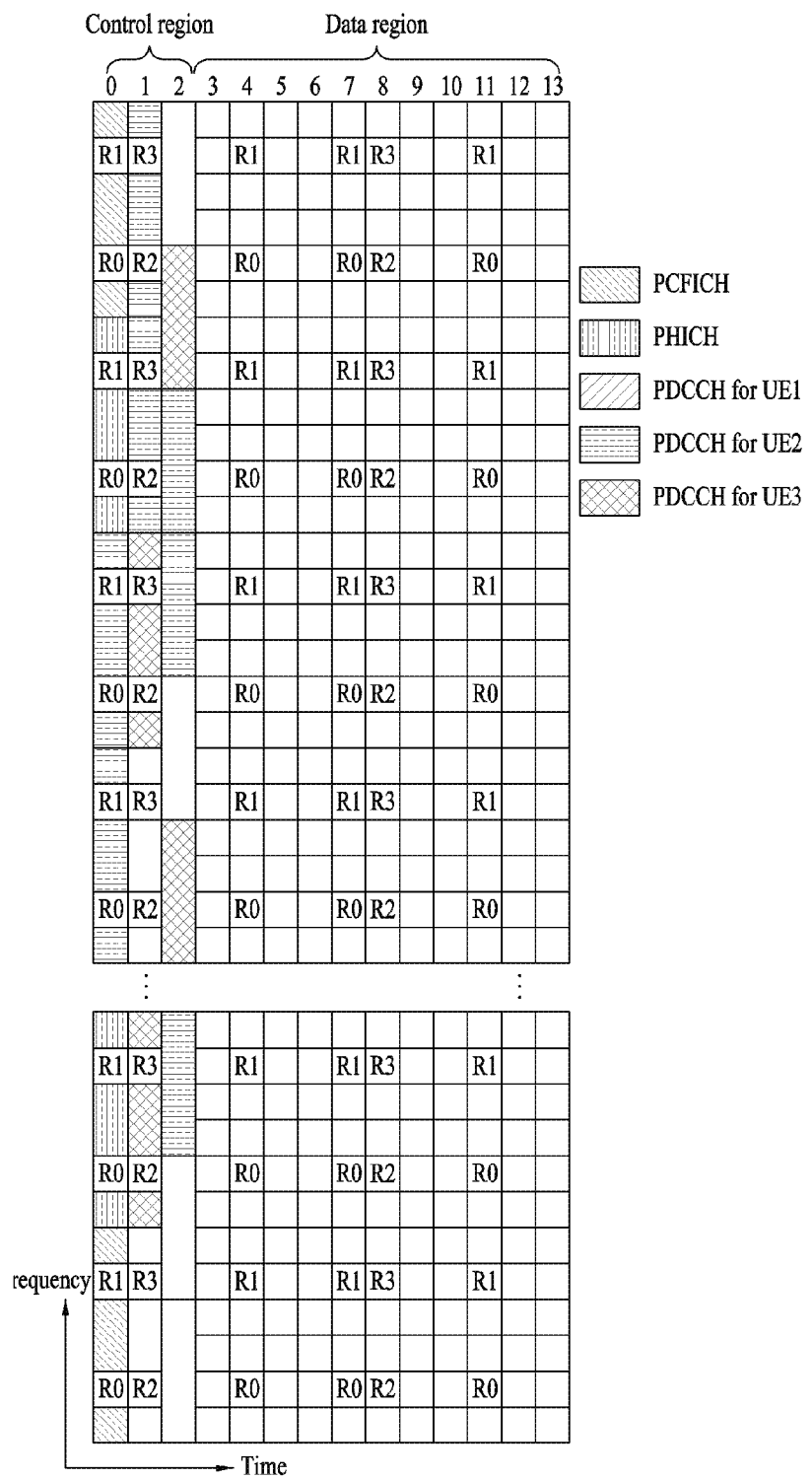
FIG. 5 illustrates an example of a downlink subframe structure.

FIG. 5 illustrates control channels included in a control region of one subframe in a downlink radio frame.

Referring to FIG. 5, the subframe consists of 14 OFDM symbols. Initial 1 to 3 OFDM symbols are used as the control region and the other 13 to 11 OFDM symbols are used as a data region depending on a subframe configuration. In this figure, R1 to R4 denote reference signals (RSs) (or pilot signals) for antennas 0 to 3. The RSs are fixed as a certain pattern in the subframe irrespective of the control region and the data region. The control channels are allocated to resources of the control region to which no RS is allocated, and traffic channels are allocated to resources of the data region to which no RS is allocated. The control channels allocated to the control region include a Physical Control Format Indicator Channel (PCFICH), a Physical HARQ (Hybrid-Automatic Repeat and Request) Indicator Channel (PHICH), a Physical Downlink Control Channel (PDCCH), etc.

The PCFICH signals the number of OFDM symbols used for the PDCCH in every subframe to the UE. The PCFICH is located in the first OFDM symbol and is configured prior to the PHICH and the PDCCH. The PCFICH consists of 4 resource element groups (REGs) each distributed over the control region based on cell identity (ID). One REG consists of 4 resource elements (REs). The RE refers to a minimum physical resource defined as one subcarrier×one OFDM symbol. The value of the PCFICH indicates one of values 1 to 3 or 2 to 4 depending on a bandwidth and is modulated through quadrature phase shift keying (QPSK).

The PHICH is used to carry HARQ ACK/NACK for uplink transmission. That is, the PHICH refers to a channel for transmitting DL ACK/NACK information for UL HARQ. The PHICH consists of 1 REG, and is scrambled cell-specifically. ACK/NACK is indicated using 1 bit, and is modulated through binary phase shift keying (BPSK). The modulated ACK/NACK is spread using a spreading factor (SF)=2 or 4. A plurality of PHICH channels mapped to the same resource form a PHICH group. The number of PHICH channels multiplexed into the PHICH group is determined depending on the number of spreading codes. The PHICH (group) is repeated 3 times to achieve diversity gain in the frequency domain and/or the time domain.

The PDCCH is allocated to initial n OFDM symbols of the subframe. Here, n is an integer equal to or greater than 1 and is indicated by the PCFICH. The PDCCH consists of one or more CCEs. The PDCCH signals information related to resource allocation of a Paging Channel (PCH) and a Downlink-Shared Channel (DL-SCH) which are transmission channels, uplink scheduling grant, HARQ information, etc. to each UE or UE group. The PCH and the DL-SCH are transmitted through a PDSCH. Accordingly, the base station and the UE generally transmit and receive data other than specific control information or specific service data through the PDSCH.

Information about a UE (or UEs) targeted by the data of the PDSCH, information about schemes for receiving and decoding the PDSCH data by the UEs, etc. are carried by the PDCCH. For example, it is assumed that a specific PDCCH is CRC-masked with radio network temporary identity (RNTI) "A" and information about data to be transmitted using radio resource (e.g., frequency location) "B" and DCI format (i.e., transmission format information (e.g., transmission block size, modulation scheme, coding information, etc.)) "C" is transmitted in a specific subframe. In this case, a UE within a cell monitors, i.e., blind-decodes, the PDCCH in a search area using RNTI information of the UE. If one or more UEs have RNTI "A", the UEs receive the PDCCH, and receive a PDSCH indicated by "B" and "C" using information of the received PDCCH.

Figure 6:
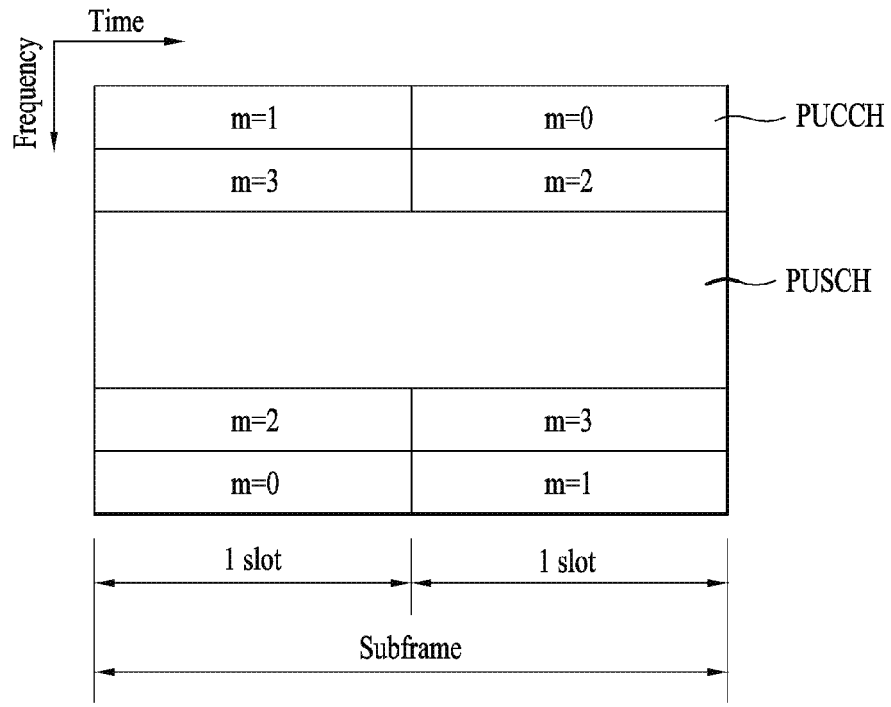
FIG. 6 is a diagram showing a structure of an uplink subframe used in LTE.

FIG. 6 illustrates the structure of a UL subframe in a LTE system.

Referring to FIG. 6, the UL subframe can be divided into a region to which Physical Uplink Control Channels (PUCCHs) carrying control information are allocated, and a region to which Physical Uplink Shared Channels (PUSCHs) carrying user data are allocated. A middle part of the subframe is allocated for the PUSCHs, and two side parts of the data region in the frequency domain are allocated for the PUCCHs. The control information carried by the PUCCH includes ACK/NACK used for HARQ, a channel quality indicator (CQI) indicating DL channel state, a rank indicator (RI) for MIMO, a scheduling request (SR) which is a UL resource allocation request, etc. The PUCCH for one UE uses one resource block which occupies different frequencies in slots of the subframe. That is, 2 resource blocks allocated for the PUCCH are frequency hopped at a slot boundary. Specifically, FIG. 6 exemplarily shows that a PUCCH of m=0, a PUCCH of m=1, a PUCCH of m=2, and a PUCCH of m=3 are allocated to the subframe.

A description is now given of a MIMO system. Multiple-Input Multiple-Output (MIMO) is a method using multiple Tx antennas and multiple Rx antennas, and this method may improve transmission and reception efficiency of data. That is, a transmitter or receiver of a wireless communication system uses multiple antennas and thus the capacity and performance thereof may be improved. In the following description of the present invention, MIMO can be called 'multiple antenna technology'.

In the multiple antenna technology, reception of one whole message does not depend on a single antenna path. Instead, in the multiple antenna technology, data fragments received through multiple antennas are collected and combined to complete data. If the multiple antenna technology is used, a data transfer rate within a cell region of a specific size may be improved, or system coverage may be improved while ensuring a specific data transfer rate. In addition, this technology can be broadly used by mobile communication devices and relays. Due to the multiple antenna technology, restriction on mobile communication traffic based on a legacy technology using a single antenna can be solved.

Figure 7:
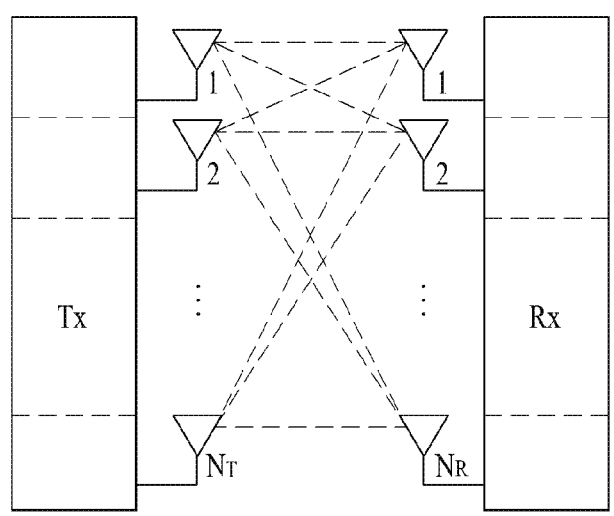
FIG. 7 is a structural diagram of a general Multiple-Input Multiple-Output (MIMO) communication system.

FIG. 7 shows the configuration of a wireless communication system including multiple antennas. When both the number of transmit (Tx) antennas and the number of Rx antennas respectively to $N_T$ and $N_R$, a theoretical channel transmission capacity of the MIMO communication system increases in proportion to the number of antennas, differently from the above-mentioned case in which only a transmitter or receiver uses several antennas, so that transmission rate and frequency efficiency can be greatly increased. In this case, the transfer rate acquired by the increasing channel transmission capacity can theoretically increase by a predetermined amount that corresponds to multiplication of a maximum transfer rate (Ro) acquired when one antenna is used and a rate of increase (Ri). The rate of increase (Ri) can be represented by the following equation 1. Herein, Ri is a smaller value between $N_T$ and $N_R$.

$$R_i = \min(N_T, N_R) \qquad \text{[Equation 1]}$$

For example, provided that a MIMO system uses four Tx antennas and four Rx antennas, the MIMO system can theoretically acquire a high transfer rate which is four times higher than that of a single antenna system. After the above-mentioned theoretical capacity increase of the MIMO system was demonstrated in the mid-1990s, many developers began to conduct intensive research into a variety of technologies which can substantially increase data transfer rate using the theoretical capacity increase. Some of the above technologies have been reflected in a variety of wireless communication standards, for example, third-generation mobile communication or next-generation wireless LAN, etc.

A variety of MIMO-associated technologies have been intensively researched by many companies or developers, for example, research into information theory associated with MIMO communication capacity under various channel environments or multiple access environments, research into a radio frequency (RF) channel measurement and modeling of the MIMO system, and research into a space-time signal processing technology.

Mathematical modeling of a communication method for use in the above-mentioned MIMO system will hereinafter be described in detail. As can be seen from FIG. 7, it is assumed that there are $N_T$ Tx antennas and $N_R$ Rx antennas. In the case of a transmission signal, a maximum number of transmission information pieces is $N_T$ under the condition that $N_T$ Tx antennas are used, so that the transmission information can be represented by a specific vector shown in the following equation 2.

$$s = [s_1, s_2, \ldots, s_{N_T}]^T \quad \text{[Equation 2]}$$

In the meantime, individual transmission information pieces $s_1, s_2, \ldots, s_{N_T}$ may have different transmission powers. In this case, if the individual transmission powers are denoted by $P_1, P_2, \ldots, P_{N_T}$, transmission information having an adjusted transmission power can be represented by a specific vector shown in the following equation 3.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

In Equation 3, $\hat{s}$ is a transmission vector, and can be represented by the following equation 4 using a diagonal matrix P of a transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

In the meantime, the information vector $\hat{s}$ having an adjusted transmission power is applied to a weight matrix W, so that $N_T$ transmission signals $x_1, x_2, \ldots, x_{N_T}$ to be actually transmitted are configured. In this case, the weight matrix W is adapted to properly distribute transmission information to individual antennas according to transmission channel situations. The above-mentioned transmission signals $x_1, x_2, \ldots, x_{N_T}$ can be represented by the following equation 5 using the vector X. Here, $W_{ij}$ denotes a weight corresponding to i-th Tx antenna and j-th information. W represents a weight matrix or precoding matrix.

$$x = \begin{bmatrix} x_1 \\ x_2 \\ \vdots \\ x_i \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & \ddots & \\ w_{N_T1} & w_{N_T2} & \cdots & w_{N_TN_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WP \quad \text{[Equation 5]}$$

Generally, a matrix rank is defined by a smaller number between the number of rows and the number of columns, in which the rows and the columns are independent of each other. Therefore, the matrix rank cannot be higher than the number of rows or columns. The rank of the channel matrix H can be represented by the following equation 6.

$$\text{rank}(H) \leq \min(N_T, N_R) \quad \text{[Equation 6]}$$

In addition, each of different pieces of information transmitted using the multiple antenna technology is now defined as a 'transport stream' or simply a 'stream'. This 'stream' can be called a 'layer'. Then, the number of transport streams cannot be greater than a channel rank which is the maximum number of different pieces of information transmittable using the multiple antenna technology. Accordingly, a channel matrix H can be expressed as given by Equation 7.

$$\text{\# of streams} \leq \text{rank}(H) \leq \min(N_T, N_R) \quad \text{[Equation 7]}$$

Here, "# of streams" denotes the number of streams. Meanwhile, it should be noted here that one stream can be transmitted through one or more antennas.

There can be a variety of methods for mapping one or more streams to multiple antennas. These methods may be described as follows depending on the type of the multiple antenna technology. A case in which a single stream is transmitted through multiple antennas can be regarded as a spatial diversity scheme, and a case in which multiple streams are transmitted through multiple antennas can be regarded as a spatial multiplexing scheme. Alternatively, a hybrid of spatial diversity and spatial multiplexing can also be used.

Hereinafter, Channel State Information (CSI) reporting will be described below. In the current LTE standard, there are two MIMO transmission schemes, open-loop MIMO operating without channel information and closed-loop MIMO operating with channel information. Particularly, in the closed-loop MIMO, each of an eNB and a UE may perform beamforming based on the channel state information to acquire the multiplexing gain of MIMO antennas. To acquire the channel state information from the UE, the eNB may allocate a PUCCH (Physical Uplink Control Channel) or PUSCH (Physical Uplink Shared Channel) to the UE and may command the UE to feed back the channel state information on the PUCCH or PUSCH.

The CSI is largely categorized into three information types, RI (Rank Indicator), PMI (Precoding Matrix Index), and CQI (Channel Quality Indication). First of all, the RI is indicates rank information on a channel as described above, and means the number of streams that may be received by the UE through the same time-frequency resources. Also, since the RI is determined by long term fading of a channel, the RI may be fed back to the eNB at a longer period than the PMI and the CQI.

Secondly, the PMI indicates a precoding matrix index of an eNB preferred by the UE based on a metric such as a signal to interference and noise ratio (SINR), reflecting the spatial characteristics of channels. Finally, the CQI is a value indicating a channel strength. In general, the CQI means a reception SINR that can be obtained when the eNB uses the PMI.

In the more advanced communication system such as the LTE-A standard, multi-user diversity has been additionally obtained using multi-user MIMO (MU-MIMO). Since interference between UEs multiplexed in an antenna domain exists in the MU-MIMO, whether CSI is accurate may affect interference of the other multiplexed UEs as well as the UE that has reported the CSI. Accordingly, more exact CSI reporting is required in the MU-MIMO than the SU-MIMO.

In this respect, in the LTE-A standard, it has been determined that the design of the final PMI is divided into W1 which is a long term and/or wideband (WB) PMI and W2 which is a short term and/or sub-band (SB) PMI.

As an example of hierarchical codebook transformation that constitutes one final PMI from W1 and W2, a long term covariance matrix of a channel may be used as expressed by the following Equation 8.

$$W = \text{norm}(W1\,W2) \quad \text{[Equation 8]}$$

In the Equation 8, W2 is a short term PMI, and represents a codeword of a codebook configured to reflect short term channel state information, W represents a codeword of the final codebook, and norm (A) means a matrix in which norm for each column of a matrix A is normalized to 1.

A detailed structure of W1 and W2 is expressed by the following Equation 9.

$$W1(i) = \begin{bmatrix} X_i & 0 \\ 0 & X_i \end{bmatrix}, \text{ where } X_i \text{ is } Nt/2 \text{ by } M \text{ matrix} \quad \text{[Equation 9]}$$

$$W2(j) = \overbrace{\begin{bmatrix} e_M^k & e_M^l & e_M^m \\ \alpha_j e_M^k & \beta_j e_M^l & \cdots & \gamma_j e_M^m \end{bmatrix}}^{i\ columns}$$

(if rank = r), where $1 \leq k, l, m \leq M$ and k, l, m are integ

In this case, Nt represents the number of transmitting antennas, and M is the number of columns of a matrix $X_i$ and represents that a total of M number of candidate column vectors exist in the matrix Xi. $e_M^k$, $e_M^l$, and $e_M^m$ are the k-th, l-th, and m-th column vectors of the matrix $X_i$ in which the k-th, l-th and m-th elements of M number of elements are 1 and the other elements are all 0. αj, βj, and γj are complex values having unit norm, and represent that phase rotation is applied to the k-th, l-th and m-th column vectors of the matrix $X_i$ when the k-th, l-th and m-th column vectors are sorted out. i is an integer more than 0 and represents PMI index indicating W1. j is an integer more than 0 and represents PMI index that indicates W2.

In the Equation 9, the structure of the codeword is designed by reflecting correlation properties of channels if intervals between cross polarized antennas are compact, for example, if the distance between neighboring antennas is less than half of signal wavelength. The cross polarized antennas may be divided into a horizontal antenna group and a vertical antenna group, wherein each of the horizontal antenna group and the vertical antenna group has uniform linear array (ULA) antenna properties, and these two antenna groups are co-located.

Accordingly, the correlation between the antennas of each group has the same linear phase increment properties, and the correlation between the antenna groups has phase rotation properties. Finally, since the codebook is the value obtained by quantization of the channel, the codebook needs to be designed by reflecting channel properties. For convenience of description, rank 1 codeword made by the aforementioned structure may be expressed by the following Equation 10.

$$W1(i) * W2(j) = \begin{bmatrix} X_i(k) \\ \alpha_j X_i(k) \end{bmatrix} \quad \text{[Equation 10]}$$

In the above Equation 10, the codeword is expressed by vectors of the number of transmitting antennas $N_T \times 1$ vector, and is structuralized by a higher vector $X_i(k)$ and a lower vector $\alpha_j X_i(k)$, each of which has correlation properties of the horizontal antenna group and the vertical antenna group. $X_i(k)$ is preferably expressed by a vector having linear phase increment properties by reflecting the correlation properties between the antennas of each antenna group, and may use a DFT matrix.

As described above, in the LTE system, the channel state information (CSI) includes, but not limited to, CQI, PMI, and RI, and all or some of CQI, PMI and RI are transmitted in accordance with a transmission mode of each UE. Periodic transmission of the channel state information will be referred to as periodic reporting, and transmission of the channel state information based on a request of the base station will be referred to as aperiodic reporting. In case of aperiodic reporting, a request bit included in uplink scheduling information transmitted from the base station is transmitted to the user equipment. Afterwards, the UE transfers the channel state information considering its transmission mode to the base station through an uplink data channel (PUSCH). In case of periodic reporting, a period and offset at the corresponding period are signaled to each UE in a unit of subframe semi-statically through an upper layer signal. Each UE transfers the channel state information considering the transmission mode to the base station through an uplink control channel (PUCCH) in accordance with a predetermined period. If uplink data simultaneously exist at the subframe for transmitting the channel state information, the channel state information is transmitted together with data through the uplink data channel (PUSCH). The base station transmits transmission timing information suitable for each UE to the UE by considering a channel status of each UE and a distribution status of UEs within a cell. The transmission timing information includes a period for transmitting the channel state information, offset, etc., and may be transmitted to each UE through RRC message.

Figures 8, 9:
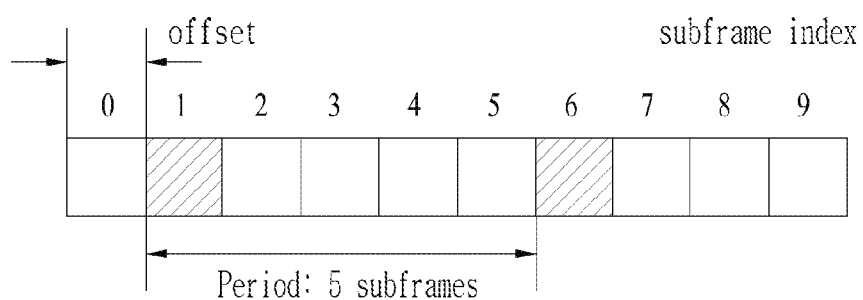
FIGS. 8 to 10 illustrate examples of periodic CSI reporting.
Figure 10:
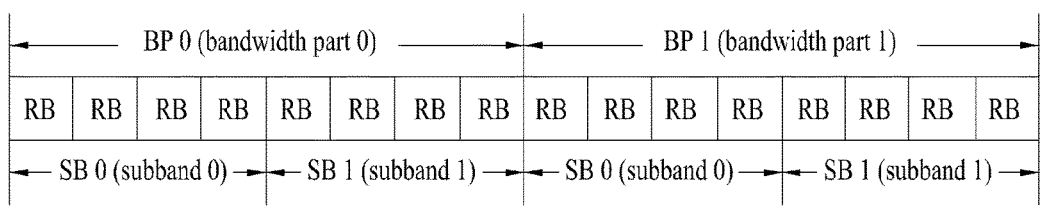

FIGS. 8 to 10 illustrate examples of periodic CSI reporting in the LTE.

Referring to FIG. 8, 4 CQI reporting modes are present in the LTE system. Specifically, the CQI reporting modes are categorized into a WB CQI mode and an SB CQI mode according to a CQI feedback type and into a no PI mode and a single PMI mode according to presence of PMI transmission. Each UE receives information composed of a combination of a period and an offset through RRC signaling for periodic CQI reporting.

FIG. 9 illustrates an example of transmitting CSI when information indicating {period '5', offset '1'} is signaled to a UE. Referring to FIG. 9, after receiving the information indicating the period of '5' and the offset of '1', the UE transmits the CSI every 5 subframes with the offset of one subframe in an increasing direction of a subframe index. Although the CSI is basically transmitted through PUCCH, if PUSCH for transmitting data is present at the same time, the CSI is transmitted together with the data through the PUSCH. The subframe index is composed of a system frame number (or a radio frame index) $n_f$ and a slot index $n_s$ (0 to 19). Since a subframe includes two slots, the subframe index can be defined as $10*n_f + \text{floor}(n_s/2)$. Here, "floor( )" denotes a floor function.

A scheme of transmitting WB CQI only and a scheme of transmitting both the WB CQI and SB CQI are present. According to the scheme of transmitting the WB CQI only, CQI information on the full band is transmitted in subframes corresponding to a CQI transmission period. When PMI also needs to be transmitted according to a PMI feedback type, as illustrated in FIG. 8, the PMI and CQI are transmitted together. According to the scheme of transmitting both of the WB CQI and SB CQI, the WB CQI and SB CQI are alternately transmitted.

FIG. 10 illustrates a system having a system bandwidth corresponding to 16 RBs. In this case, it is assumed that the system bandwidth is composed of two bandwidth parts (BPs) BP0 and BP1 each of which includes two subbands (SBs) SB0 and SB1 each of which is composed of 4 RBs. However, the number of BPs and the size of each SB may be varied according to system bandwidth. Furthermore, the number of SBs constituting each BP may depend on the number of RBs, the number of BPs and an SB size.

In the case of the scheme of transmitting both the WB CQI and SB CQI, the WB CQI is transmitted in a first CQI transmission subframe and CQI corresponding to the SB having a good channel state between SB0 and SB1 belonging to BP0 and an index of the corresponding SB (e.g., SSI (subband selection indicator)) are transmitted in a second CQI transmission subframe. Then, CQI corresponding to the SB with a good channel state between SB0 and SB1 belonging to BP1 and an index of the corresponding SB are transmitted in a next CQI transmission subframe. In this manner, the WB CQI is transmitted and then CQI information on respective BPs is sequentially transmitted. CQI information on BPs can be sequentially transmitted one to four times between two WB CQIs. For example, if CQI information on BPs is sequentially transmitted once between two WB CQIs, transmission can be performed in the order of WB CQI⇒ BP0 CQI⇒ BP1 CQI⇒ WB CQI. If CQI information on BPs is sequentially transmitted four times between two WB CQIs, transmission can be performed in the order of WB CQI⇒ BP0 CQI⇒ BP1 CQI⇒ BP0 CQI⇒ BP1 CQI⇒ BP0 CQI⇒ BP1 CQI⇒ BP0 CQI⇒ BP1 CQI⇒ WB CQI. Information about how many times BP CQI is sequentially transmitted is signaled by a higher layer (e.g. RRC layer).

Hereinafter, based on the above-mentioned description, a method for a receiving end (e.g., UE) to efficiently feed CSI back in downlink communication that uses multiple antennas for a plurality of users, which is proposed in the present invention, is described in detail.

As described above, in the wireless communication system, a receiving end is configured to feed back RI, PMI and CQI for a channel to a transmitting end (e.g., eNB) by considering multiple antennas. The RI means the maximum number of layers that the receiving end can receive through a specific channel using the same frequency-time resource. In other words, the RI means the maximum number of different pieces of information that can be transmitted by the transmitting end. As a value reflecting spatial characteristics of a channel, the PMI indicates a precoding matrix index of the transmitting ends, which is preferred by the receiving end, with reference to metrics such as SINR and the like. As a value indicating the strength of a channel, the CQI indicates information on channel quality when selected PMI and RI are applied. The above-mentioned channel information is used in the course of establishing a connection between the transmitting end and the receiving end. In particular, the channel information is used in order for the transmitting end to select a receiving end to which the transmitting end transmits a signal or to apply the number of layers and precoding suitable for the selected receiving end.

The importance of the channel information has increased since a system for a multi-user has been established. In the system for the multi-user, an eNB selects a plurality of users based on channel information (i.e., RI/CQI/PMI) fed back from individual receiving ends and then simultaneously transmits signals to the selected users. In this case, since interference between the receiving ends affects system performance, the eNB performs precoding in transmitting the signals to eliminate the interference.

If the individual receiving ends feedback inaccurate channel information, the eNB cannot perform the precoding for efficiently controlling the interference that occurs between the receiving ends, whereby it causes significant performance degradation to the receiving ends. For this reason, in the system for the multi-user, accurate channel information is more important than in a system for a single-user.

Regarding the above-described channel information feedback, the CSI feedback schemes defined in the LTE specification (3GPP LTE release-10) are categorized into periodic reporting through an uplink control channel, PUCCH and aperiodic reporting transmitted by a request from the eNB through an uplink data channel, PUSCH. The aperiodic reporting is configured in each receiving ends by a request bit included in scheduling information transmitted from the eNB to the receiving end. And, if receiving the request from the eNB, each receiving end reports the channel information to the eNB through the PUSCH in consideration of its own transmission mode (i.e., transmission mode of the receiving end (e.g., UE)).

The aperiodic reporting of the channel information is described in detail. Table 1 shows reporting modes according to CQI/PMI feedback types

TABLE 1

| | | PMI Feedback Type | |
|---|---|---|---|
| | | No PMI (OL, TD; single-antenna) | With PMI (CL) |
| PUSCH CQI feedback type | Wideband (wideband CQI) | | Mode 1-2: Multiple PMI<br>RI<br>$1^{st}$ wideband CQI(4 bit)<br>$2^{nd}$ wideband CQI(4 bit) if RI > 1<br>N*Subband PMI (4 bit)<br>(N is the total # of subbands)<br>(if 8Tx Ant, N*subband W2 + wideband W1) |
| | UE Selected (subband CQI) | Mode 2-0<br>RI (only for Open-loop SM)<br>$1^{st}$ wideband CQI(4 bit) + Best-M CQI(2 bit)<br>(Best-M CQI: average CQI for M SBs selected from total N SBs)<br>Best-M index (L bit) | Mode 2-2: Multiple PMI<br>RI<br>$1^{st}$ wideband CQI(4 bit) + Best-M CQI(2 bit)<br>$2^{nd}$ wideband CQI(4 bit) + Best-M CQI(2 bit)<br>if RI > 1<br>Best-M index (L bit)<br>Wideband PMI(4 bit) + Best-M PMI(4 bit)<br>(if 8Tx Ant, wideband W2 + Best-M W2 + wideband W1) |

TABLE 1-continued

| | PMI Feedback Type | |
|---|---|---|
| | No PMI (OL, TD; single-antenna) | With PMI (CL) |
| Higher layer-configured (subband CQI) | Mode 3-0<br>RI (only for Open-loop SM)<br>$1^{st}$ widebandCQI(4 bit) +<br>N*subbandCQI(2 bit) | Mode 3-1: Single PMI<br>RI<br>$1^{st}$ wideband CQI(4 bit) + N*subbandCQI(2 bit)<br>$2^{nd}$ wideband CQI(4 bit) + N*subbandCQI<br>(2 bit) if RI > 1<br>Wideband PMI(4 bit)<br>(if 8Tx Ant, wideband W2 + wideband W1) |

In Table 1, WB (wideband) CQI/PMI indicate CQI/PMI calculated in the frequency band corresponding to the entire system bandwidth and SB (subband) CQI/PMI indicate CQI/PMI calculated in each subband obtained by dividing the wideband into a plurality of blocks, i.e., subbands.

Moreover, the rows in Table 1 are separated according to CQI feedback types. In other words, the first, second, and third rows indicates feedback of CQI for the wideband, feedback of the WB CQI and CQI selected in consideration of M subbands selected in the WB, and feedback of the WB CQI and each subband CQI, respectively. The columns in Table 1 are divided according to presence of PMI feedback. That is, the first column means no PMI feedback and the second column means to provide PMI feedback. In other words, in case of PMI feedback modes (i.e., modes 1-2, 2-2, and 3-1), PMI is calculated based on the WB or SB according to the corresponding mode and then the calculated PMI is fed back.

In the legacy wireless communication system (i.e., 3GPP LTE release-10), subband sizes are set for feedback modes 1-2, 3-0, and 3-1 according to system bandwidths as shown in Table 2. For convenience of description, a wireless communication system before the 3GPP LTE release-10 is hereinafter defined as the legacy wireless communication system.

TABLE 2

| System Bandwidth $N_{RB}^{DL}$ | Subband Size (k) |
|---|---|
| 6-7 | NA |
| 8-10 | 4 |
| 11-26 | 4 |
| 27-63 | 6 |
| 64-110 | 8 |

For instance, in case of a system bandwidth composed of 28 resource blocks (RBs), one SB includes 6 RBs and one WB includes 5 SBs. In this case, the last $5^{th}$ subband has a size of 4 RBs due to lack of the system bandwidth.

As a subband size becomes smaller, more accurate PMI CQI values is calculated, whereby it results in performance improvement of the system for the multi-user. Thus, in terms of the system performance improvement, the SB CQI/PMI are preferable to the WB CQI/PMI.

However, as can be seen in Table 1, with respect to reporting modes in the legacy wireless system (3GPP LTE release-10), a feedback mode capable of simultaneously supporting the SB CQI and the SB PMI is not provided.

For example, in the mode 1-2 related to WB feedback, a UE may feedback the WB CQI and the SB PMI but the SB CQI/PMI are not supported at the same time. Similarly, in the mode 3-1, the SB CQI and the WB PMI are supported but the SB CQI/PMI are not supported at the same time. That is, the mode capable of simultaneously supporting the SB CQI/PMI is not provided in the legacy wireless communication systems (i.e., systems before the 3GPP LTE release-10).

In the case of the mode for simultaneously supporting the SB CQI/PMI, it can result in the performance improvement but overhead needs to be considered since the CQI and the PMI should be calculated in each subband for the SB CQI/PMI feedback.

When D2D communication is introduced to the above-described wireless communication system (e.g., 3GPP LTE system or 3GPP LTE-A system), particular methods for performing the D2D communication are described hereinafter.

Figure 11:
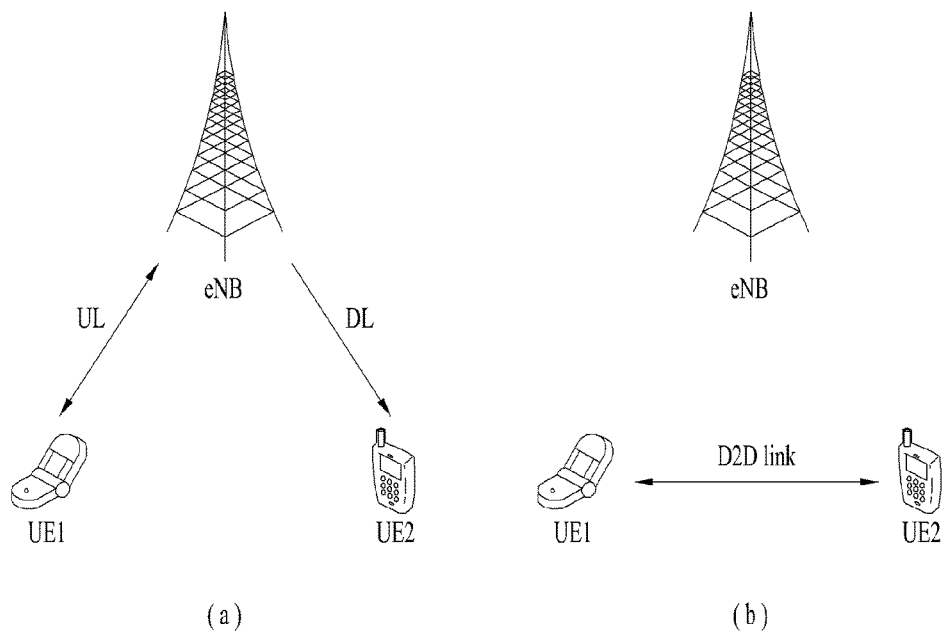
FIG. 11 is a diagram for describing a concept of D2D communication.

FIG. 11 illustrates a concept of D2D communication. FIG. 11(a) shows a conventional eNB-based communication scheme. According to this scheme, UE1 can transmits=data to an eNB in uplink and the eNB can forward the data from UE1 to UE2 in downlink.

FIG. 11(b) shows a UE-to-UE communication scheme as an exemplary D2D communication scheme. Herein, data exchange between UEs can be performed without intervention of an eNB. A link directly established between devices can be called a D2D link. Compared to the conventional eNB-based communication scheme, the D2D communication has advantages in that latency is reduced and a small amount of radio resources is required.

Although the D2D communication corresponds to a scheme for supporting communication between devices (or between UEs) without the intervention of the eNB, the D2D communication should not cause interference or disturbance to the legacy wireless communication system (e.g. 3GPP LTE/3GPP LTE-A) since the D2D communication is performed by reusing resources of the legacy wireless communication. In this context, it is also important to minimize interference caused to the D2D communication by a UE or an eNB operating in the legacy wireless communication system.

Based on the above description, a method for CSI reporting is proposed in the present invention. That is, according to the method proposed in the present invention, in case that a plurality of UEs form a group similar to the case of the D2D communication, a specific UE in the group can share part of CSI with different UEs in the corresponding group. In this case, the CSI reporting for the part of the CSI can be performed by the specific UE alone.

In the current 3GPP LTE system (i.e., beyond 3GPP release vii), there is a closed loop technology, through which individual UEs transmit information on channels between an eNB and the UEs to the eNB. For the closed loop technology, the individual UEs measure channels between the eNB and the UEs through CRS or CSI-RS first. Thereafter, based on the measured channel, the individual UEs reports RI (rank information), PMI (precoding information) and CQI (channel gain information) to the eNB in order for the eNB to obtain channel information.

Meanwhile, the UE selects most appropriate PMI from a codebook. In this case, while only a single structure of a codebook is used for 2Tx antenna in the current 3GPP LTE system, a dual structure of a codebook can be considered if the eNB uses 4Tx and 8Tx antennas. In the dual structure of the codebook, W1 codebook for a long term (in the time domain) or wideband (in the frequency domain) and W2 codebook for a short term or subband are combined with each other.

In this case, since PMI information for the W1 codebook (or information for the long term or wideband) targets a wide time or frequency domain, UEs located close to each other are highly likely to report the same PMI information. Similarly, the same RI information is highly likely to be reported.

Thus, the present invention proposes the following reporting method. That is, according to the method proposed in the present invention, common RI (or common part of PMI information) is shared between a plurality of UEs located to relatively close to each other, to which the same CSI reporting can be applied, and a representative UE can report the common RI or the common part of the PMI information shared by the UEs to an eNB alone. In the present invention, commonly overlapping CSI is defined as 'common CSI' and CSI except the 'common CSI' of entire CSI is defined as 'separate CSI'. Further, although a plurality of UEs constituting a specific group are assumed to report CSI to the same eNB for convenience of description, the present invention is not limited thereto.

Further, the present invention can be applied to a case of 3D MIMO. In the case of the 3D MIMO, a vertical direction of antenna elements and a horizontal direction of antenna elements are present in antennas of an eNB. In this case, resources may be insufficient to feed back PMI with respect to entire antenna elements at one time. Thus, to form overall PMI, PMI for a long term and PMI for a short term can be operated together. For instance, PMI with respect to the vertical direction of the antenna elements may be configured with long term feedback and PMI with respect to the horizontal direction of the antenna elements may be configured with short term feedback. That is, the present invention can also be applied to this case by considering the long term feedback PMI as 'common CSI' and the short term feedback PMI as 'separate CSI'.

First of all, CSI reporting schemes of the legacy LTE system are described to compare them with those of the present invention. According to a procedure configured in the legacy LTE system, 1) each UE receives information related to PUCCH reporting through RRC signaling and 2) each UE transmits relevant RI, PMI, and CQI to an eNB.

On the premise of the above-mentioned CSI reporting in the conventional LTE system, the present invention may assume the following three situations A) to C):

A) a D2D situation in which grouping has been previously performed;

B) a situation in which grouping for group CSI reporting is being performed; and C) a situation in which grouping is not performed.

In the case A), utilization of a group created through grouping for D2D communication will be described. In particular, the grouping may be performed for communication between UEs in the current D2D situation.

As one example of grouping in D2D, a randomly selected UE transmits a message signal for discovery and other UEs respond to the message signal. Based on at least one response, a representative UE can be selected. Thereafter, a group is formed based on power of a signal transmitted to the representative UE. For example, if a level of signal power for group determination is set to be high, UEs located within a narrow range form a group with the representative UE as the center. On the contrary, if the level of the signal power is set to be low, UEs located within a wide range forms a group with the representative UE as the center.

In the case B), unlike the grouping for the D2D communication, grouping for group CSI reporting is considered. In other words, unlike the case A), the present invention can be also applied to a situation in which the D2D communication is not performed. In addition, in case of a D2D group for D2D communication, UEs located in a wide area (which is not preferred in case of CSI reporting) may be grouped. According to the present invention, in the case B), the grouping can be performed with a randomly selected UE as the center similar to the D2D grouping.

Alternatively, after reviewing CSI/RSRP reported from UEs, an eNB can determine a representative UE through grouping. In this case, the eNB can broadcast grouping information and ID of the representative UE to the UEs. Moreover, when the grouping is performed based on reported CSI (i.e., UEs' reporting CSI), the eNB may select a group and a representative UE in consideration of how much part of 'common CSI' of the UEs is overlapped. Furthermore, in case of grouping on the basis of RSRP, the eNB selects a representative UE based on uplink power and then estimates that UEs in a group are able to receive a signal from the representative UE. Thereafter, the eNB may finally determine a group and a representative UE. In this case, the representative UE can be determined in accordance with an intermediate value of measured uplink power. Alternatively, it can be determined with reference to a case that a range of fluctuation in the measured uplink power is lower than a threshold (i.e., uniform uplink power is maintained, for example, a minimum range).

Regarding the case C), a situation in which a plurality of UEs are not grouped may be considered. In this case, a representative UE can be selected in a random manner. Alternatively, after reviewing CSI/RSRP reported from UEs (i.e., UEs' reporting CSI/RSRP), an eNB can determine a representative UE. In this case, the eNB can broadcast ID of the representative UE to the UES. After receiving the ID of the representative UE, the UEs detects DCI for PUCCH based on the received ID. Subsequently, the UE may receive common CSI information by obtaining PUCCH of the representative UE.

In the case A), B), or C), UE's grouping information and a representative UE may be changed after elapse of a prescribed time.

Hereinafter, the embodiments of the present invention are described in detail.

First Embodiment

A first embodiment of the present invention is described based on the aforementioned cases A) and B). In the situations A) and B), grouping of a plurality of UEs has been performed and a representative UE has been determined. In addition, assume that information on the representative UE and the grouping is shared between the UEs.

Figure 12:
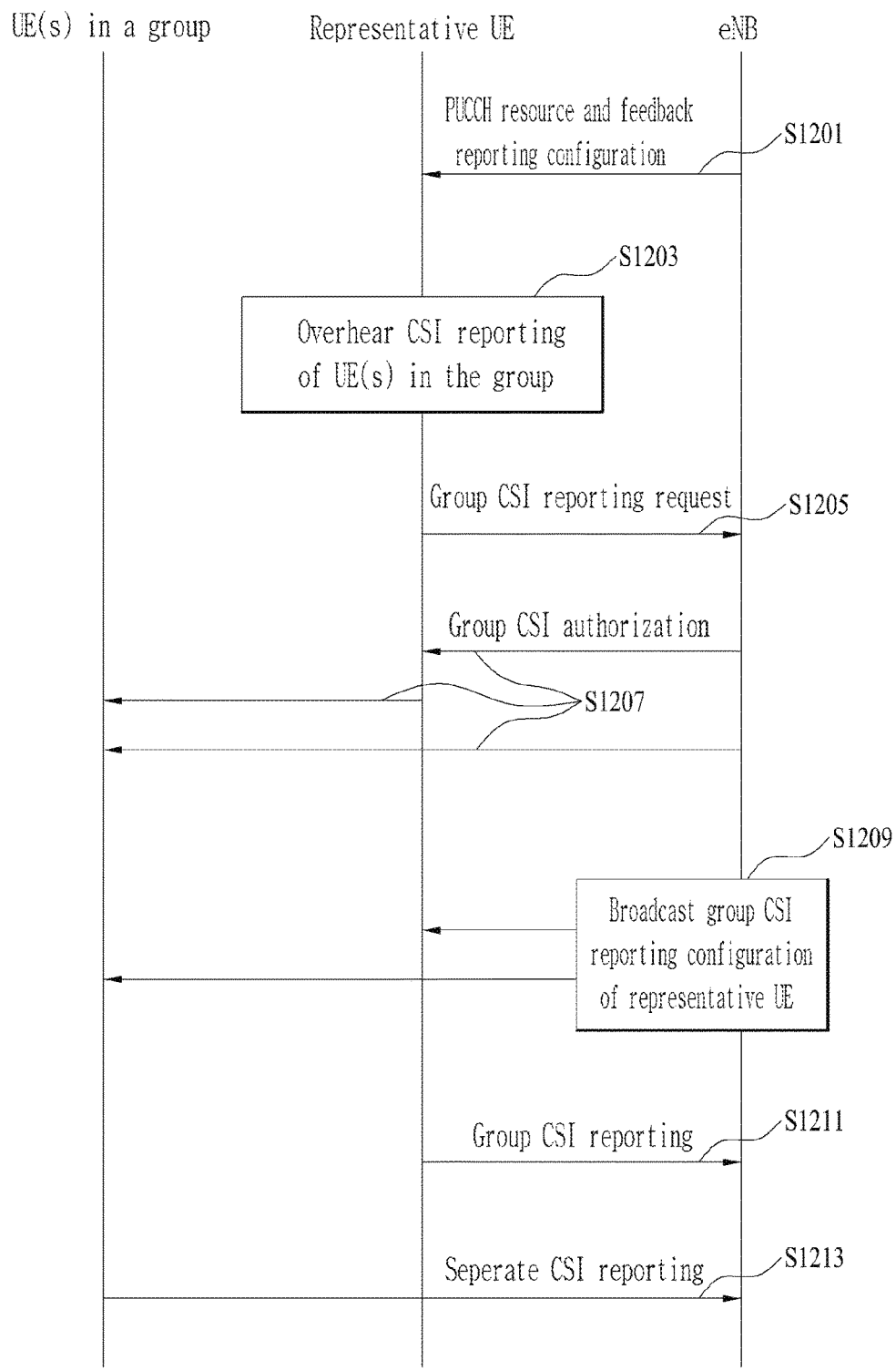
FIG. 12 is a reference diagram for describing a first embodiment according to the present invention.

FIG. 12 is a reference diagram for describing a first embodiment according to the present invention.

According to the first embodiment of the present invention, an eNB (or UEs in the group) transmits PUCCH resource information and feedback reporting configuration information of the UEs in its group to the representative UE [S1201]. That is, the representative UE receives the PUCCH resource information of the grouped UEs from the eNB (or the UEs in the group). For convenience of description, FIG. 12 shows a case that the UE(s) in the group transmits the PUCCH resource information and the feedback reporting configuration information. However, it is apparent that the present invention can be applied to a case that the information is transmitted from the eNB to the representative UE.

The representative UE overhears PUCCH reports of the UEs in the group and then determines whether group CSI reporting is suitable. In this case, whether the group CSI reporting is suitable is determined based on whether it is included in a range of similarity. Information on such a range of similarity may be predetermined or indicated through higher layer signaling [S1203]. Alternatively, the step of overhearing the PUCCH resource information of the UEs in the group by the representative UE may be omitted. In other words, the eNB notifies the UEs in the group including the representative UE that the representative UE transmits common CSI. And, the UEs receives configurations of PUCCH resource information and feedback configuration information, which will be transmitted by the representative UE. Subsequently, the representative UE transmits the common CSI or its own CSI to the eNB. After overhearing the common CSI of the representative UE, the UEs in the group determine whether the common CSI can be commonly used. If determining that the UEs in the group can share the common CSI with the representative UE, they can transmit separate CSI only. In this case, the UEs in the group provide the eNB with feedback of whether they will share the common CSI together with the separate CSI.

More particularly, after overhearing the PUCCH reports of the UEs, the representative UE compares its own CSI with UEs' CSI. In this case, RI and wideband PMI may correspond to main comparison targets since the RI and the WB PMI can be set as 'common CSI'. In other words, the RI and the WB PMI correspond to most common values between the grouped UEs.

If it is determined that the group CSI reporting is possible, the representative UE transmits to the eNB information indicating that the group CSI reporting can be performed [S1205]. That is, based on the PUCCH reports of the UEs in the group overheard in the step S1203, the representative UE measures how many UEs in the group can use the 'common CSI'. If determining that there is no significant error in channel state measurement between the eNB and the UEs in the group even if the group CSI reporting is performed, the representative UE notifies the eNB that the group CSI reporting is possible through RRC signaling or the like.

In step S1207, if the eNB authorizes the representative UE to perform the group CSI reporting, i) the eNB may inform the representative UE of the authorization through RRC signaling or the like, ii) the eNB may broadcast the authorization to the UEs in the group, or iii) the representative UE may broadcast the authorization.

If authorizing the group CSI reporting, the eNB may assign a group CSI reporting configuration only for the group CSI reporting to the representative UE [S1209]. If reporting for CSI has been performed, the step 1209 could be omitted. However, in some cases, a group CSI reporting configuration only for the 'common CSI' may be configured for the representative UE.

Thus, if the group CSI reporting is authorized by the eNB, the UEs in the group may receive PUCCH resource information and feedback reporting configuration information of the representative UE from the eNB (or the representative UE) [S1209]. Although FIG. 12 illustrates a case that a PUCCH resource and feedback reporting configuration of the representative UE are broadcasted by the eNB, the representative UE may transmit its own PUCCH resource information and feedback reporting configuration information.

Thereafter, the representative UE may perform the group CSI reporting or its previous CSI reporting [S1211]. In this case, since values of CSI/RSRP of the representative UE may be considered as representative values of CSI/RSRP of the different UEs in the group, it is possible to perform the previous CSI reporting of the representative UE. In particular, the representative UE can transmit only the 'common CSI' that should be commonly reported by the UEs. Alternatively, if the representative UE needs to perform the CSI reporting, the representative UE can transmit its own 'separate CSI' together.

Further, after overhearing the group CSI reporting or the previous CSI reporting of the representative UE, the different UEs in the group may report 'separate CSI' based on the CSI transmitted from the representative UE (i.e., common CSI) [S1213].

If the different UEs in the group determine that the 'common CSI' transmitted by the representative UE can be used together by overhearing the group CSI reporting, the different UEs in the group report only 'separate CSI' that reflects the 'common CSI' reported by the representative UE to the eNB. If determining that it is difficult to use the information transmitted by the representative UE together, the different UEs in the group report their own RI, PMI and CQI (i.e., RI, PMI and CQI of the individual different UEs in the group) all together instead of the common CSI.

In this case, when performing PUCCH reporting, the different UEs in the group inform the eNB of whether the 'common CSI' transmitted by the representative UE can be used together through one field. Hereinafter, for convenience of description, the above-mentioned filed is defined as GCSI (group CSI).

Second Embodiment

Figure 13:
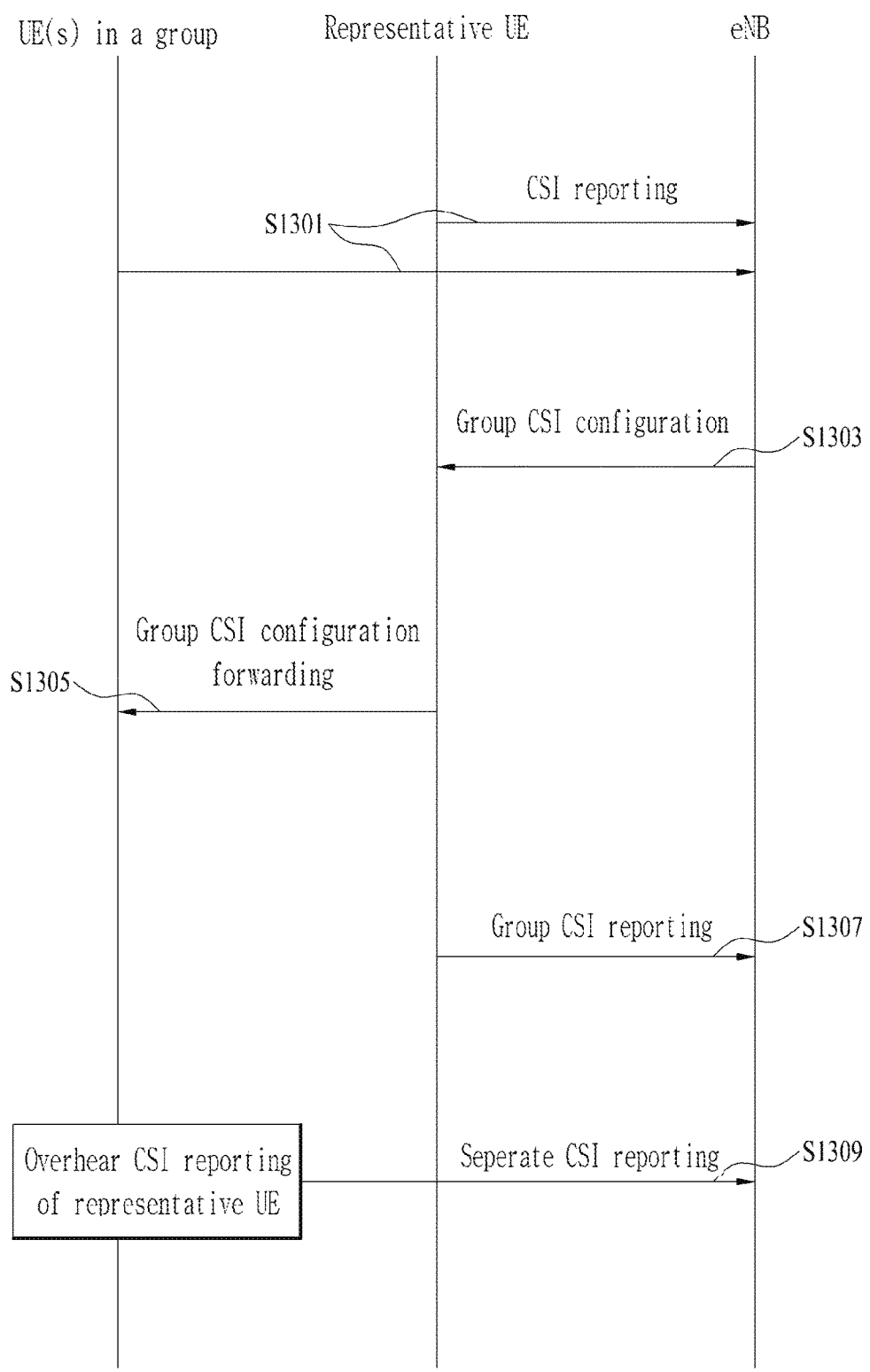
FIG. 13 is a reference diagram for describing a second embodiment according to the present invention.

FIG. 13 is a reference diagram for describing a second embodiment according to the present invention.

A second embodiment of the present invention is described by assuming the above-mentioned cases A) and B). In the above-described situations A) and B), grouping and a representative UE has been determined. In addition, assume that information on the representative UE and the grouping is shared between the UEs.

First of all, after receiving CSI reporting of the UEs in the group and CSI reporting of the representative UE, an eNB determines whether it is preferred to perform group CSI reporting by associating the UEs in the group with the representative UE. If determining that the group CSI reporting is suitable, the eNB transmits a signal for indicating a start of the group CSI reporting to the representative UE through RRC signaling or the like [S1301]. In this case, after receiving the signal for indicating the initiation of the group CSI reporting, the representative UE may forwards it to remaining UEs in the group. Alternatively, the eNB may broadcast the initiation of the group CSI reporting in order to transmit it to the different UEs in the group as well as the representative UE.

Particularly, after receiving the CSI reporting of the UEs in the group and the CSI reporting of the representative UE, the eNB determines whether the group CSI reporting is suitable. That is, the eNB measures how many UEs among the UEs in the group are able to use 'common CSI'. If the eNB determines that the group CSI reporting is suitable, i) the eNB may inform the representative UE of the initiation of the group CSI reporting through RRC signaling, ii) the eNB may broadcast the initiation of the group CSI reporting to the UEs in the group, or iii) the representative UE may broadcast the initiation of the group CSI reporting.

When the group CSI reporting is initiated, the eNB may assign a group CSI reporting configuration only for the group CSI reporting to the representative UE [S1303]. If reporting for CSI has been performed, the step S1303 could be omitted. However, although the CSI reporting has been already performed, a group CSI reporting configuration only for the 'common CSI' may be configured for the representative UE.

In addition, when the group CSI reporting is initiated, the UEs in the group receive PUCCH resource information and feedback reporting configuration information of the representative UE from the eNB or the representative UE [S1305]. Although FIG. 13 shows a case that the representative UE forwards a group CSI configuration, it is apparent that the present invention can be applied to a case that the eNB transmits the group CSI configuration.

Thereafter, the representative UE may perform the group CSI reporting or its previous CSI reporting [S1307]. In particular, the representative UE can transmit only the 'common CSI' that should be commonly reported by the UEs. Alternatively, if the representative UE needs to perform the CSI reporting, the representative UE can transmit its own 'separate CSI' together.

Further, after overhearing the group CSI reporting or the previous CSI reporting from the representative UE, the different UEs in the group may report 'separate CSI' based on the 'common CSI' [S1309]. If the different UEs in the group determine that the 'common CSI' transmitted by the representative UE can be used together by overhearing the group CSI reporting, the different UEs in the group report only 'separate CSI' that reflects the 'common CSI' reported by the representative UE to the eNB. If determining that it is difficult to use the information transmitted by the representative UE, the different UEs in the group report their own RI, PMI and CQI (i.e., RI, PMI and CQI of the individual different UEs in the group) all together instead of the common CSI.

In this case, when performing PUCCH reporting, the different UEs in the group inform the eNB of whether the 'common CSI' transmitted by the representative UE can be used together through one field. This field can be defined as the GCSI (group CSI) as described above.

Third Embodiment

A third embodiment of the present invention is described based on the assumption of the aforementioned case C) (i.e., the situation in which grouping is not performed). In this embodiment, it is possible to configure a plurality of representative UEs within a cell in a random manner. Alternatively, after reviewing CSI/RSRP reported from UEs (i.e., UEs' reporting CSI/RSRP), an eNB can determine a plurality of the representative UEs within the cell. In this case, the eNB can broadcast ID of the representative UE to the UEs.

Figure 14:
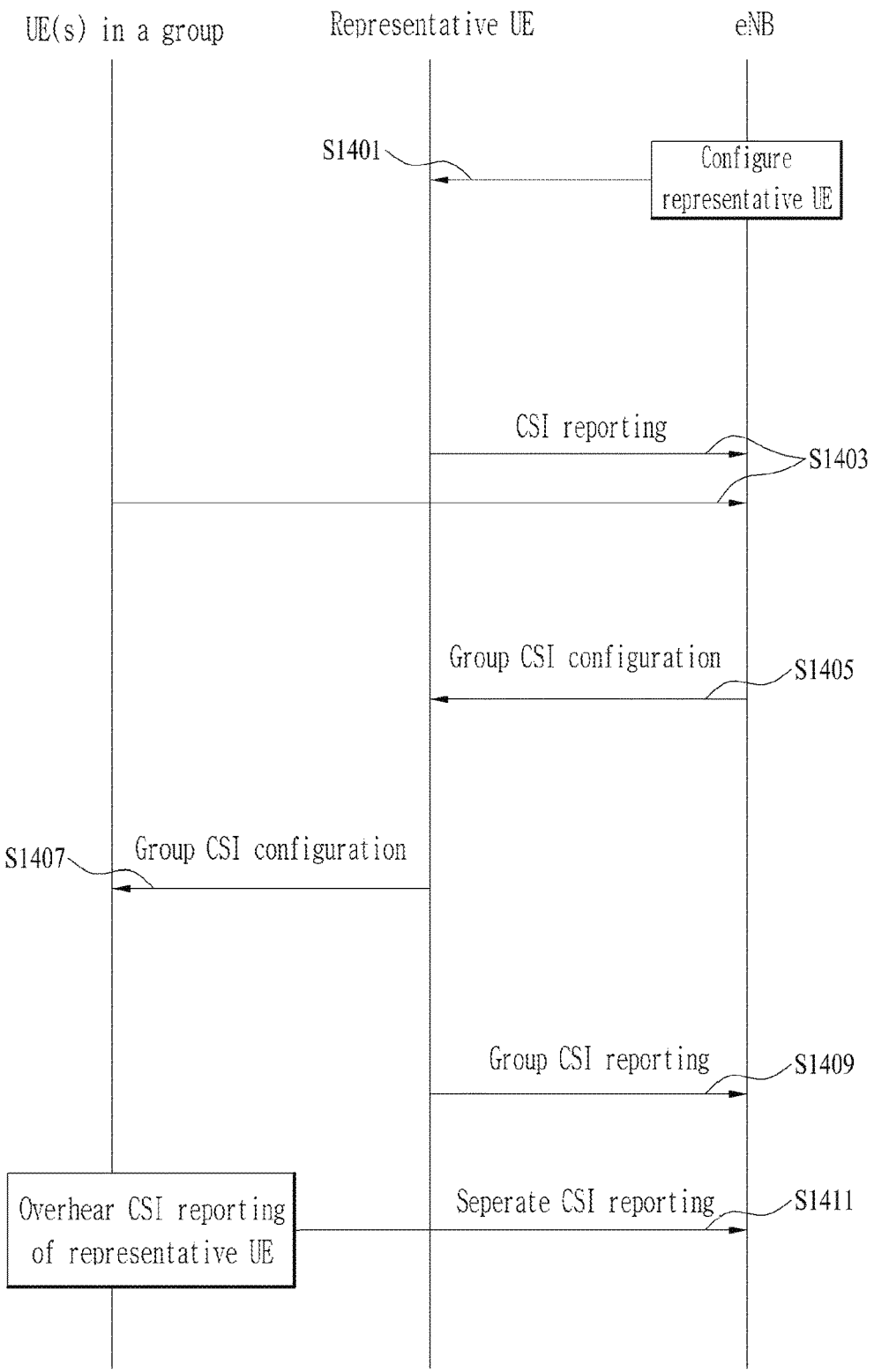
FIG. 14 is a reference diagram for describing a third embodiment according to the present invention.

The third embodiment of the present invention is described with reference to FIG. 14.

In step S1401, the eNB selects a plurality of the representative UEs.

In step S1403, after overhearing and reviewing CSI reporting of UEs in the cell and CSI reporting of the representative UEs, the eNB determines whether group CSI reporting is suitable. If determining that the group CSI reporting is suitable, the eNB transmits a signal for indicating a start of the group CSI reporting to the representative UEs through RRC signaling or the like.

In particular, based on CSI/RSRP reported from the UEs, the eNB measures how many UEs and representative UEs can use 'common CSI'. If the eNB determines that the group CSI reporting is suitable, i) the eNB may inform the representative UEs of the initiation of the group CSI reporting through RRC signaling, ii) the eNB may broadcast the initiation of the group CSI reporting to the UEs in the cell, or iii) the representative UE may broadcast the initiation of the group CSI reporting.

In step S1405, if the group CSI reporting is initiated, the eNB may assign a group CSI reporting configuration only for the group CSI reporting to the representative UEs. If there is a representative UE which has been performed reporting for CSI, the step 1405 could be omitted. However, in some cases, a group CSI reporting configuration only for the 'common CSI' may be configured for the representative UEs.

In step S1407, if the group CSI reporting is initiated, the UEs in the cell receive PUCCH resource information and feedback reporting configuration information of the representative UEs from the eNB or the representative UEs.

In step S1409, the representative UEs may perform the group CSI reporting or their previous CSI reporting. In particular, the representative UEs can transmit only the 'common CSI' that should be commonly reported by the UEs. Alternatively, if the representative UEs need to perform the CSI reporting, the representative UEs can transmit their own 'separate CSI' together.

Further, after overhearing the group CSI reporting of the representative UEs or the CSI reporting of the representative UEs, which is performed according to the conventional scheme, the different UEs in the cell may select most suitable representative UE (e.g., a UE is in best alignment) and then report 'separate CSI' based on 'common CSI' of the selected representative UE [S1411].

If different UEs in a group determine that the 'common CSI' transmitted by the representative UE can be used together by overhearing the group CSI reporting, the different UEs in the group report only 'separate CSI' that reflects the 'common CSI' reported by the representative UE to the eNB. If determining that it is difficult to use the information transmitted by the representative UE, the different UEs in the group report their own RI, PMI and CQI (i.e., RI, PMI and CQI of the individual different UEs in the group) all together instead of the common CSI.

In this case, when performing PUCCH reporting, the different UEs in the group inform the eNB of whether the 'common CSI' transmitted by the representative UE can be used together through one field. This field can be defined as the GCSI (group CSI) as described above.

Moreover, according to the third embodiment of the present invention, since grouping of a plurality of UEs has not been performed, there may be a plurality of the representative UEs in the cell. Thus, information on the representative UEs having information to be commonly used by UEs may be added to the GCSI field.

Further, in the above-described first, second, or third embodiment of the present invention, when the group CSI reporting is released, the eNB may transmit a signal for indicating a stop of the group CSI reporting to the representative UEs. Alternatively, the eNB may broadcast to UEs in the group/cell whether the group CSI reporting is released or the representative UEs may broadcast to the UEs in the group/cell whether the group CSI reporting is released.

Hereinafter, the aforementioned GCSI is described in detail. In the current LTE/LTE-A standard, PUCCH reporting modes and PUCCH reporting payloads according to the reporting modes are defined as shown in Table 3. Particularly, Table 3 shows the PUCCH reporting modes and the PUCCH reporting payloads defined in the clause 7.2.2 of 3GPP TS 36.213, the LTE standard specification.

Figure 15:
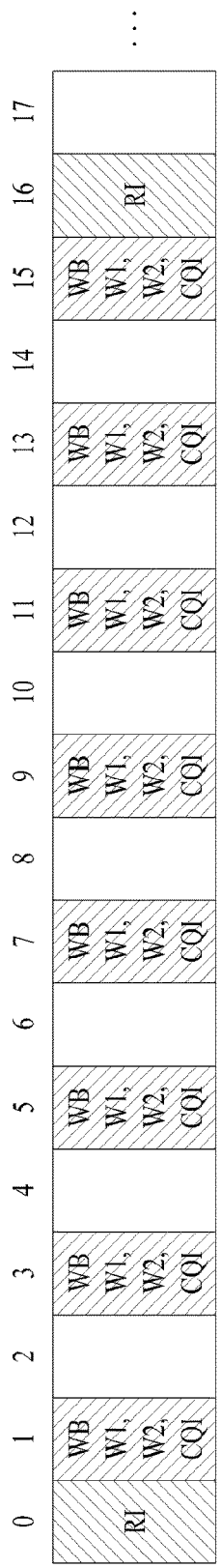
FIG. 15 illustrates an example of reporting submode B in PUCCH reporting mode 1-1.

In FIG. 15, RI corresponds to PUCCH reporting type 3 in Table 3 and wideband W1 and W2, and CQI correspond to PUCCH reporting type 2C in Table 3. In this case, if a rank is 2, total 15 bit(s) are used since W1, W2, and CQI are 4 bit(s), 4 bit(s), and 7 bit(s), respectively (i.e., W1=4 bit(s), W2=4 bit(s), CQI=7 bit(s)). And, it exceeds the maximum 11 bit(s).

TABLE 3

| PUCCH Reporting Type | Reported | Mode State | Mode 1-1 (bits/BP) | Mode 2-1 (bits/BP) | Mode 1-0 (bits/BP) | Mode 2-0 (bits/BP) |
|---|---|---|---|---|---|---|
| 1 | Sub-band CQI | RI = 1 | NA | 4 + L | NA | 4 + L |
|  |  | RI > 1 | NA | 7 + L | NA | 4 + L |
| 1a | Sub-band CQI/ second PMI | 8 antenna ports RI = 1 | NA | 8 + L | NA | NA |
|  |  | 8 antenna ports 1 < RI < 5 | NA | 9 + L | NA | NA |
|  |  | 8 antenna ports RI > 4 | NA | 7 + L | NA | NA |
| 2 | Wideband CQI/PMI | 2 antenna ports RI = 1 | 6 | 6 | NA | NA |
|  |  | 4 antenna ports RI = 1 | 8 | 8 | NA | NA |
|  |  | 2 antenna ports RI > 1 | 8 | 8 | NA | NA |
|  |  | 4 antenna ports RI > 1 | 11 | 11 | NA | NA |
| 2a | Wideband first PMI | 8 antenna ports RI < 3 | NA | 4 | NA | NA |
|  |  | 8 antenna ports 2 < RI < 8 | NA | 2 | NA | NA |
|  |  | 8 antenna ports RI = 8 | NA | 0 | NA | NA |
| 2b | Wideband CQI/ second PMI | 8 antenna ports RI = 1 | 8 | 8 | NA | NA |
|  |  | 8 antenna ports 1 < RI < 4 | 11 | 11 | NA | NA |
|  |  | 8 antenna ports RI = 4 | 10 | 10 | NA | NA |
|  |  | 8 antenna ports RI > 4 | 7 | 7 | NA | NA |
| 2c | Wideband CQI/ first PMI/ second PMI | 8 antenna ports RI = 1 | 8 | NA | NA | NA |
|  |  | 8 antenna ports 1 < RI ≤ 4 | 11 | NA | NA | NA |
|  |  | 8 antenna ports 4 < RI ≤ 7 | 9 | NA | NA | NA |
|  |  | 8 antenna ports RI = 8 | 7 | NA | NA | NA |
| 3 | RI | 2/4 antenna ports, 2-layer spatial multiplexing | 1 | 1 | 1 | 1 |
|  |  | 8 antenna ports, 2-layer spatial multiplexing | 1 | NA | NA | NA |
|  |  | 4 antenna ports, 4-layer spatial multiplexing | 2 | 2 | 2 | 2 |
|  |  | 8 antenna ports, 4-layer spatial multiplexing | 2 | NA | NA | NA |
|  |  | 8-layer spatial multiplexing | 3 | NA | NA | NA |
| 4 | Wideband CQI | RI = 1 or RI > 1 | NA | NA | 4 | 4 |
| 5 | RI/first PMI | 8 antenna ports, 2-layer spatial multiplexing | 4 | NA | NA | NA |
|  |  | 8 antenna ports, 4 and 8-layer spatial multiplexing | 5 |  |  |  |
| 6 | RI/PTI | 8 antenna ports, 2-layer spatial multiplexing | NA | 2 | NA | NA |
|  |  | 8 antenna ports, 4-layer spatial multiplexing | NA | 3 | NA | NA |
|  |  | 8 antenna ports, 8-layer spatial multiplexing | NA | 4 | NA | NA |

In particular, 'first PMI' and RI in Table 3 may correspond to the 'common CSI' according to the present invention and 'second PMI' and CQI in Table 3 may correspond to the 'separate CSI' according to the present invention.

FIG. 15 illustrates an example of reporting submode B in PUCCH reporting mode 1-1. If an eNB has an 8Tx antenna and submode B is reported in PUCCH reporting mode 1-1, a reporting operation is performed as shown in FIG. 15.

Therefore, subsampling is introduced in the current LTE in order to perform the reporting by reducing the amount of bit(s). In this process, information of W1 and W2 may become somewhat inaccurate.

Hence, the present invention defines new PUCCH reporting types as shown in Table 4 in a manner of adding the GCSI to Table 3.

TABLE 4

| PUCCH Reporting Type | Reported | Mode State | Mode 1-1 (bits/BP) | Mode 2-1 (bits/BP) | Mode 1-0 (bits/BP) | Mode 2-0 (bits/BP) |
|---|---|---|---|---|---|---|
| 1 | Sub-band CQI | RI = 1 | NA | 4 + L | NA | 4 + L |
|  |  | RI > 1 | NA | 7 + L | NA | 4 + L |
| 1a | Sub-band CQI/ second PMI | 8 antenna ports RI = 1 | NA | 8 + L | NA | NA |
|  |  | 8 antenna ports 1 < RI < 5 | NA | 9 + L | NA | NA |
|  |  | 8 antenna ports RI > 4 | NA | 7 + L | NA | NA |

TABLE 4-continued

| PUCCH Reporting Type | Reported | Mode State | Mode 1-1 (bits/BP) | Mode 2-1 (bits/BP) | Mode 1-0 (bits/BP) | Mode 2-0 (bits/BP) |
|---|---|---|---|---|---|---|
| 2 | Wideband CQI/PMI | 2 antenna ports RI = 1 | 6 | 6 | NA | NA |
|   |   | 4 antenna ports RI = 1 | 8 | 8 | NA | NA |
|   |   | 2 antenna ports RI > 1 | 8 | 8 | NA | NA |
|   |   | 4 antenna ports RI > 1 | 11 | 11 | NA | NA |
| 2a | Wideband first PMI | 8 antenna ports RI < 3 | NA | 4 | NA | NA |
|   |   | 8 antenna ports 2 < RI < 8 | NA | 2 | NA | NA |
|   |   | 8 antenna ports RI = 8 | NA | 0 | NA | NA |
| 2b | Wideband CQI/ second PMI | 8 antenna ports RI = 1 | 8 | 8 | NA | NA |
|   |   | 8 antenna ports 1 < RI < 4 | 11 | 11 | NA | NA |
|   |   | 8 antenna ports RI = 4 | 10 | 10 | NA | NA |
|   |   | 8 antenna ports RI > 4 | 7 | 7 | NA | NA |
| 2c | Wideband CQI/ first PMI/ second PMI | 8 antenna ports RI = 1 | 8 | NA | NA | NA |
|   |   | 8 antenna ports 1 < RI ≤ 4 | 11 | NA | NA | NA |
|   |   | 8 antenna ports 4 < RI ≤ 7 | 9 | NA | NA | NA |
|   |   | 8 antenna ports RI = 8 | 7 | NA | NA | NA |
| 2d | GCSI/ Wideband first PMI |   |   |   |   |   |
| 3 | RI | 2/4 antenna ports, 2-layer spatial multiplexing | 1 | 1 | 1 | 1 |
|   |   | 8 antenna ports, 2-layer spatial multiplexing | 1 | NA | NA | NA |
|   |   | 4 antenna ports, 4-layer spatial multiplexing | 2 | 2 | 2 | 2 |
|   |   | 8 antenna ports, 4-layer spatial multiplexing | 2 | NA | NA | NA |
|   |   | 8-layer spatial multiplexing | 3 | NA | NA | NA |
| 3a | GCSI/RI |   |   |   |   |   |
| 4 | Wideband CQI | RI = 1 or RI > 1 | NA | NA | 4 | 4 |
| 5 | RI/first PMI | 8 antenna ports, 2-layer spatial multiplexing | 4 | NA | NA | NA |
|   |   | 8 antenna ports, 4 and 8-layer spatial multiplexing | 5 |   |   |   |
| 5a | GCSI/RI/ first PMI |   |   |   |   |   |
| 6 | RI/PTI | 8 antenna ports, 2-layer spatial multiplexing | NA | 2 | NA | NA |
|   |   | 8 antenna ports, 4-layer spatial multiplexing | NA | 3 | NA | NA |
|   |   | 8 antenna ports, 8-layer spatial multiplexing | NA | 4 | NA | NA |
| 6a | GCSI/RI/PTI |   |   |   |   |   |
| 7 | GCSI |   |   |   |   |   |

In Table 4, additional PUCCH reporting types that include the aforementioned GCSI are defined. In particular, the GCSI is newly added to PUCCH reporting types 2d, 3a, 5a and 6a.

If group CSI reporting is initiated, a UE reports information including the GCSI to an eNB. Based on the GCSI, the eNB can determine whether to use the 'common CSI' (i.e., RI and first PMI) of a representative UE together. If the GCSI is set to 0, UEs in a group report RI, PMI and CQI information except the GCSI in the same manner as previously reported (i.e., before the group CSI reporting is performed). If the GCSI is set to 1, the UEs in the group may report only the 'separate CSI' except the 'common CSI'. In this case, it is the matter of course that the UEs in the group can report more accurate information by further adding the 'separate CSI' to space reserved for the 'common CSI'.

Figure 16:
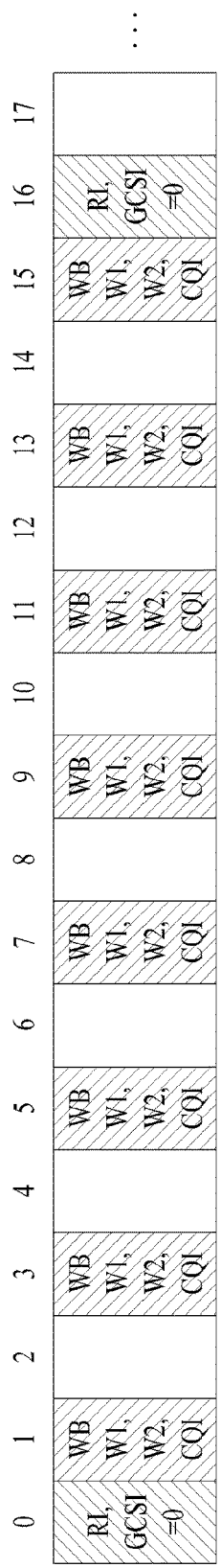
FIG. 16 and FIG. 17 illustrate examples of applying the present invention to the example of FIG. 15.
Figure 17:
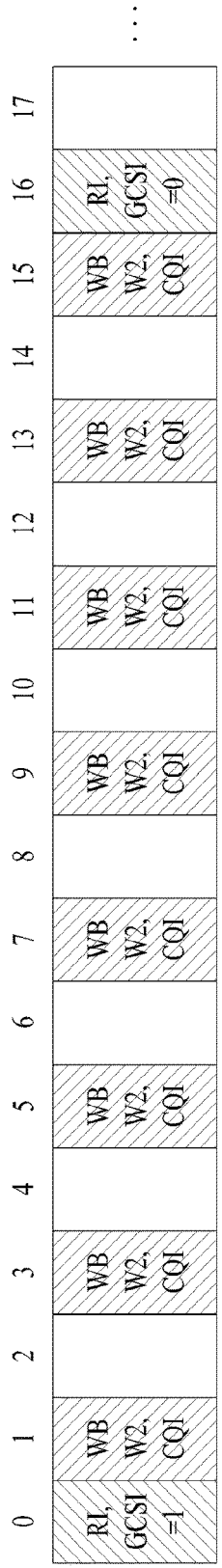

FIG. 16 and FIG. 17 illustrate examples of applying the present invention to the example of FIG. 15. For instance, if the eNB has the 8Tx antenna and the submode B is reported in the PUCCH reporting mode 1-1, the reporting is performed as shown in FIG. 15. If the present invention is applied to this case, it can be used as shown in FIG. 16 and FIG. 17.

In FIG. 16, since GCSI is equal to 0 (i.e., GCSI=0), wideband W1 and W2 and CQI are reported in the same manner as reported in the conventional LTE system. On the other hand, in FIG. 17, since GCSI is equal to 1 (i.e., GCSI=1), more accurate values with respect to wideband W2 and CQI can be reported without subsampling.

Moreover, according to the present invention, by separately defining a GCSI field like PUCCH reporting type 7 in Table 4, such a GCSI field can be reported with a period different from that of CSI.

Furthermore, according to the present invention, the GCSI may be used to indicate both of the 'RI' and the 'first PMI' in the 'common CSI' through 1-bit information as described in the example. However, in relations between the representative UE and other UEs in the group, the GCSI can be implemented as one of i) 1-bit for indicating whether only the 'RI' is used in common, ii) 1-bit for indicating whether only the 'first PMI' is used in common, iii) 1-bit for indicating whether both of the 'RI' and 'first PMI' are used in common and iv) 2-bit for indicating whether each of the 'RI' and 'first PMI' is used in common.

However, the present invention does not exclude that the GCI filed includes an indication of whether the 'second PMI' and 'CQI' are commonly used together. That is, in some cases, the GCSI field can be used to indicate whether the 'second PMI' and 'CQI' are used in common.

In the present invention, at least parts of UEs belonging to a specific group can be changed. If a representative UE is periodically selected according to the first embodiment, the corresponding group may be reconfigured, i.e., some UE in the group can be changed. If a UE belonging to the specific group moves out of the corresponding specific group due to location movement and the like, the UE cannot overhear group CSI reporting of the representative UE. That is, in this case, the group CSI reporting is not preferred. Thus, the UE that moves out of the group may perform separate reporting by setting the GCSI to 0.

Figure 18:
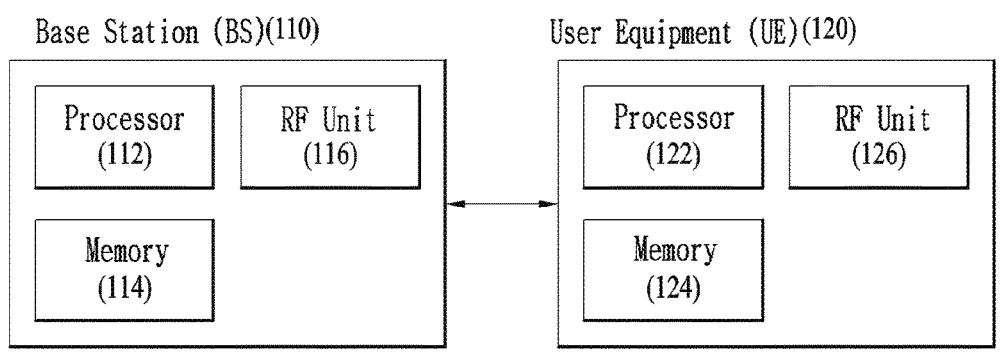
FIG. 18 illustrates a base station and a user equipment applicable to an embodiment of the present invention.

FIG. 18 illustrates a base station and a user equipment applicable to an embodiment of the present invention.

If a relay node is included in a wireless communication system, a communication in backhaul link is performed between a base station and the relay node and a communication in access link is performed between the relay node and a user equipment. Therefore, the base station or user equipment shown in the drawing can be substituted with the relay node in some cases.

Referring to FIG. 18, a wireless communication system includes a base station (BS) 110 and a user equipment (UE) 120. The base station 110 includes a processor 112, a memory 114 and an RF (radio frequency) unit 116. The processor 112 can be configured to implement the procedures and/or methods proposed by the present invention. The memory 114 is connected to the processor 112 and stores various kinds of informations related to operations of the processor 112. The RF unit 116 is connected to the processor 112 and transmits and/or receives radio or wireless signals. The user equipment 120 includes a processor 122, a memory 124 and an RF unit 126. The processor 122 can be configured to implement the procedures and/or methods proposed by the present invention. The memory 124 is connected to the processor 122 and stores various kinds of informations related to operations of the processor 122. The RF unit 126 is connected to the processor 122 and transmits and/or receives radio or wireless signals. The base station 110 and/or the user equipment 120 can have a single antenna or multiple antennas.

The above-described embodiments may correspond to combinations of elements and features of the present invention in prescribed forms. And, it may be able to consider that the respective elements or features may be selective unless they are explicitly mentioned. Each of the elements or features may be implemented in a form failing to be combined with other elements or features. Moreover, it may be able to implement an embodiment of the present invention by combining elements and/or features together in part. A sequence of operations explained for each embodiment of the present invention may be modified. Some configurations or features of one embodiment may be included in another embodiment or can be substituted for corresponding configurations or features of another embodiment. And, it is apparently understandable that a new embodiment may be configured by combining claims failing to have relation of explicit citation in the appended claims together or may be included as new claims by amendment after filing an application.

In this disclosure, a specific operation explained as performed by a base station can be performed by an upper node of the base station in some cases. In particular, in a network constructed with a plurality of network nodes including a base station, it is apparent that various operations performed for communication with a user equipment can be performed by a base station or other network nodes except the base station. In this case, 'base station' can be replaced by such a terminology as a fixed station, a Node B, an eNode B (eNB), an access point and the like.

Embodiments of the present invention may be implemented using various means. For instance, embodiments of the present invention may be implemented using hardware, firmware, software and/or any combinations thereof. In case of the implementation by hardware, one embodiment of the present invention may be implemented by at least one of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, one embodiment of the present invention may be implemented by modules, procedures, and/or functions for performing the above-explained functions or operations. Software code may be stored in a memory unit and may be then drivable by a processor.

Herein, the memory unit may be located inside or outside of the processor and the memory unit may transmit and receive data to and from the processor by using a wide range of methods that have already been disclosed.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

Although a method for reporting channel state information in a wireless communication system and apparatus therefor are described mainly with examples applied to 3GPP LTE system, the present invention can be applied to various kinds of wireless communication systems as well as to the 3GPP LTE system.

What is claimed is:
1. A method of reporting channel state information (CSI) in a wireless communication system, the method performed by a first user equipment (UE) and comprising:
being assigned a group CSI reporting configuration associated with a UE group from a base station (BS);
receiving CSI reporting for each of a plurality of second UE;
determining whether to report group CSI based on the received CSI reporting;
broadcasting the group CSI reporting configuration to the UE group; and
transmitting the group CSI to the BS when it is determined to report the group CSI,
wherein the UE group includes the first UE and at least one of the plurality of second UE, and
wherein the group CSI reporting configuration defines CSI of the first UE as the group CSI, the CSI corresponding to a portion of CSI of a plurality of individual UE that comprise the UE group.

2. The method of claim 1, further comprising transmitting an intermediate value of the CSI of the plurality of individual UE.

3. The method of claim 1, wherein the first UE has a minimum range of fluctuations in the CSI of the individual UE.

4. The method of claim 1, wherein each of the plurality of second UE independently transmits separate CSI of each of the plurality of second UE, the separate CSI not corresponding to the group CSI.

5. The method of claim 4, wherein the each of the plurality of second UE transmits an indicator to the BS to distinguish the separate CSI from the group CSI.

6. The method of claim 5, wherein each of the plurality of second UE transmits the separate CSI based on a PUCCH (physical uplink control channel) reporting type defined for reporting the indicator.

7. The method of claim 5, wherein the indicator is an identifier of a UE transmitting the group CSI associated with individual second UE.

8. A first user equipment (UE) for reporting channel state information (CSI) in a wireless communication system, the first UE comprising:
a radio frequency unit configured to transmit and receive signals; and
a processor configured to
be assigned a group CSI reporting configuration associated with a UE group from a base station (BS);
control the RF unit to receive CSI reporting for each of a plurality of second UE;
determine whether to report the group CSI based on the received CSI reporting;
control the RF unit to broadcast the group CSI reporting configuration to the UE group; and
control the RF unit to transmit the group CSI to the BS when it is determined to report the group CSI,
wherein the UE group includes the first UE and at least one of the plurality of second UE, and
wherein the group CSI reporting configuration defines CSI of the first UE as the group CSI, the CSI corresponding to a portion of CSI of a plurality of individual UE that comprise the UE group.

9. The first UE of claim 8, wherein the processor is further configured to control the RF unit to transmit an intermediate value of the CSI of the plurality of individual UE.

10. The first UE of claim 8, wherein the first UE has a minimum range of fluctuations in the CSI of the individual UE.

11. The first UE of claim 8, wherein each of the plurality of second UE independently transmits separate CSI of each of the plurality of second UE, the separate CSI not corresponding to the group CSI.

12. The first UE of claim 11, wherein the each of the plurality of second UE transmits an indicator to the BS to distinguish the separate CSI from the group CSI.

13. The first UE of claim 12, wherein the each of the plurality of second UE transmits the separate CSI based on a PUCCH (physical uplink control channel) reporting type defined for reporting the indicator.

14. The first UE of claim 12, wherein the indicator is an identifier of a UE transmitting the group CSI associated with individual second UE.

* * * * *